US008755048B2

(12) United States Patent
Funayama et al.

(10) Patent No.: US 8,755,048 B2
(45) Date of Patent: Jun. 17, 2014

(54) SPECTRUM MEASURING APPARATUS FOR MOVER

(75) Inventors: Ryuji Funayama, Yokohama (JP); Shinya Kawamata, Gotemba (JP); Masato Endo, Susono (JP); Yasukata Yokochi, Susono (JP); Yasuhiro Yoshida, Susono (JP); Tomoaki Handa, Susono (JP); Kenichi Kitahama, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 147 days.

(21) Appl. No.: 13/321,968

(22) PCT Filed: May 29, 2009

(86) PCT No.: PCT/JP2009/059915

§ 371 (c)(1), (2), (4) Date: Jan. 30, 2012

(87) PCT Pub. No.: WO2010/137175

PCT Pub. Date: Dec. 2, 2010

(65) Prior Publication Data

US 2012/0188545 A1 Jul. 26, 2012

(51) Int. Cl.
*G01J 3/46* (2006.01)

(52) U.S. Cl.
USPC .......... 356/402

(58) Field of Classification Search
USPC .......... 356/402–425
See application file for complete search history.

(56) References Cited

U.S. PATENT DOCUMENTS

| | | | | |
|---|---|---|---|---|
| 6,122,051 | A | 9/2000 | Ansley et al. | |
| 6,647,139 | B1 * | 11/2003 | Kunii et al. | 382/159 |
| 6,856,354 | B1 | 2/2005 | Ohsawa | |

(Continued)

FOREIGN PATENT DOCUMENTS

| | | | |
|---|---|---|---|
| DE | 296 154 | A5 | 10/1983 |
| DE | 10 2004 019 651 | A1 | 11/2005 |

(Continued)

OTHER PUBLICATIONS

Kolodner, M. A., "Automated target detection system for hyperspectral imaging sensors," Applied Optics, vol. 47, No. 28, pp. F61-F70, (Oct. 1, 2008).

(Continued)

*Primary Examiner* — Tarifur Chowdhury
*Assistant Examiner* — Abdullahi Nur
(74) *Attorney, Agent, or Firm* — Oblon, Spivak, McClelland, Maier & Neustadt, L.L.P.

(57) ABSTRACT

A movable body spectrum measuring apparatus including a dictionary data storing unit for storing spectrum data containing wavelength information and light intensity information of an object being measured, and a limitation information storing unit for storing limitation information to regulate the wavelength information into partial wavelength information. The movable body spectrum measuring apparatus further including a discrimination level setting unit for setting selectively the limitation information corresponding to the discrimination level required of the object being measured, a restricting unit for restricting the spectrum data regarding the observation light to the spectrum data composed exclusively of the wavelength information limited by the limitation information, and a discrimination unit for discriminating the object being measured based on the comparison between the restricted spectrum data and the spectrum data regarding the dictionary data storing unit.

17 Claims, 17 Drawing Sheets

(56) References Cited

U.S. PATENT DOCUMENTS

| | | | |
|---|---|---|---|
| 7,031,496 | B2 | 4/2006 | Shimano et al. |
| 7,415,338 | B2 | 8/2008 | Monji et al. |
| 2004/0155202 | A1 | 8/2004 | Poteet et al. |
| 2007/0179712 | A1 | 8/2007 | Brandt et al. |
| 2010/0182294 | A1 | 7/2010 | Roshan et al. |

FOREIGN PATENT DOCUMENTS

| | | | |
|---|---|---|---|
| DE | 10 2005 024 716 | A1 | 12/2006 |
| DE | 10 2008 016 766 | A1 | 11/2009 |
| EP | 0 642 005 | | 3/1995 |
| JP | 01 273113 | | 11/1989 |
| JP | 08 193945 | | 7/1996 |
| JP | 10 221036 | | 8/1998 |
| JP | 10 341458 | | 12/1998 |
| JP | 2000 113159 | | 4/2000 |
| JP | 2000 152269 | | 5/2000 |
| JP | 2000 251052 | | 9/2000 |
| JP | 2001 165775 | | 6/2001 |
| JP | 2001 295180 | | 10/2001 |
| JP | 2002 083297 | | 3/2002 |
| JP | 2004 280591 | | 10/2004 |
| JP | 2005 170063 | | 6/2005 |
| JP | 2005 242914 | | 9/2005 |
| JP | 2005 283336 | | 10/2005 |
| JP | 2005 286649 | | 10/2005 |
| JP | 2006 011671 | | 1/2006 |
| JP | 2006 507483 | | 3/2006 |
| JP | 2006 145362 | | 6/2006 |
| JP | 2006 222899 | | 8/2006 |
| JP | 2007 293558 | | 11/2007 |
| JP | 2008 124941 | | 5/2008 |
| JP | 2009 014373 | | 1/2009 |
| JP | 2009 105576 | | 5/2009 |
| JP | 2010-529590 | | 8/2010 |
| WO | 99 63311 | | 12/1999 |
| WO | 2007 126004 | | 11/2007 |
| WO | WO 2008/162922 | | 12/2008 |

OTHER PUBLICATIONS

International Search Report Issued Jun. 30, 2009 in PCT/JP09/059915 Filed May 29, 2009.

International Preliminary Report on Patentability Issued Apr. 12, 2011 in PCT/JP09/059915 Filed May 29, 2009.

U.S. Appl. No. 13/322,508, filed Nov. 25, 2011, Funayama, et al.

U.S. Appl. No. 13/322,503, filed Nov. 25, 2011, Endo, et al.

U.S. Appl. No. 13/322,019, filed Nov. 22, 2011, Funayama, et al.

U.S. Appl. No. 13/322,056, filed Nov. 22, 2011, Kawamata, et al.

Office Action mailed Mar. 29, 2013, in co-pending U.S. Appl. No. 13/322,503.

Office Action issued Apr. 29, 2013 in German Patent Application No. 11 2009 004 829.3 (with English translation).

Office Action dated Jul. 19, 2013, issued in German Patent Application No. 11 2009 004 861.7.

German Office Action dated May 2, 2013 for German Patent Application No. 11 2009 04 831.5 with English translation of relevant portions thereof.

* cited by examiner

Fig.5

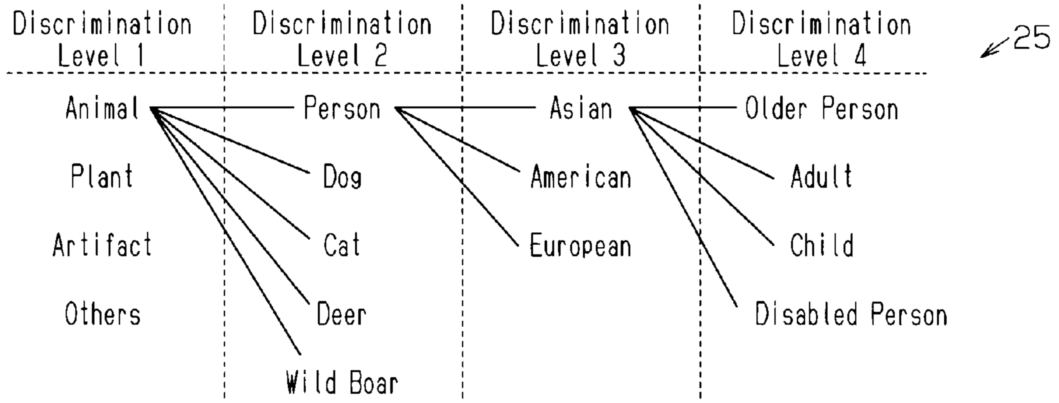

Fig.6

Wavelength Band Map

26

| | Discrimination Level 1 | Discrimination Level 2 | Discrimination Level 3 | Discrimination Level 4 |
|---|---|---|---|---|
| Wavelength Band [nm] | 400-2500 | Person: 400-1500 | Asian: 400-800 1000-1300 | Older Person: 1000-1450 |
| | | Dog: 500-2000 | American: 400-900 1000-1500 | Adult: 900-1400 |
| | | ⋮ | ⋮ | ⋮ |

Fig.7

Wavelength Resolution Map

27

| | Discrimination Level 1 | Discrimination Level 2 | Discrimination Level 3 | Discrimination Level 4 |
|---|---|---|---|---|
| Wavelength Resolution [nm] | 100 | Person:50 | Asian:10 | Older Person:5 |
| | | Dog:50 | American:10 | Adult:5 |
| | | ⋮ | ⋮ | ⋮ |

SPECTRUM MEASURING APPARATUS FOR MOVER

FIELD OF THE DISCLOSURE

The present invention relates to a movable body spectrum measuring apparatus for discriminating a measuring object on the basis of spectrum data regarding the measuring object as measured by a spectrum sensor mounted on a movable body such as a vehicle, in particular, an automobile.

BACKGROUND OF THE DISCLOSURE

In recent years, vehicles such as automobiles have been often provided with a drive assisting device that recognizes the state of a pedestrian, a traffic light or the like, which dynamically varies around the vehicle, and assists driving and decision making for the driver. Most of such apparatuses take an image of the state of a traffic light, a pedestrian or the like by use of a CCD camera, processes the taken image in real time to recognize the state and uses the recognition result for the above-mentioned assistance for driving. However, since the shape of a pedestrian generally varies depending on size, orientation or presence or absence of his/her belongings, it is difficult to correctly recognize the existence of a pedestrian on the basis of the shape obtained by the above-mentioned image processing. Although traffic lights are highly standardized in size and color, the shapes disadvantageously vary depending on the viewing angle, and shape recognition through the above-mentioned image processing has its limits.

Patent Document 1 describes a remote sensing technique using spectrum data collected by a spectrum sensor as one technique for recognizing a measuring object. According to this technique, measuring objects such as woods, agricultural fields and urban areas, which are difficult to be recognized only by a visible light region, are discriminated by classifying and characterizing multi-spectrum image data also including invisible light regions photographed by the spectrum sensor mounted on an airplane, an artificial satellite, or the like.

PRIOR ART DOCUMENTS

Patent Documents

Patent Document 1: Japanese Laid-Open Patent Publication No. 2000-251052

Patent Document 2: Japanese Laid-Open Patent Publication No. 2006-145362

DISCLOSURE OF THE INVENTION

Problems to be Solved by the Invention

Since a spectrum sensor observes a brightness value (light intensity) of each wavelength range also including the invisible light region, characteristics of the measuring object can be found by comparing brightness values of wavelengths with each other and furthermore, allowing the measuring object to be discriminated. In addition, in recent years, a hyper spectrum sensor having a wide imageable bandwidth and a high resolution of a few nm to a dozens of nm has been put into practical use as the above-mentioned spectrum sensor (refer to Patent Document 2).

Thus, it has been recently considered that such a spectrum sensor mounted on a vehicle such as an automobile, and various measuring objects around the vehicle are discriminated on the basis of spectrum data taken by the spectrum sensor. However, since the amount of such spectrum data, especially spectrum data obtained by the above-mentioned hyper spectrum sensor is enormous, an increase in time required to process the data is not negligible and real-time adequacy regarding discriminating the measuring object is necessarily lowered.

Accordingly, it is an objective of the present invention to provide a movable body spectrum measuring apparatus that can discriminate a measuring object with high accuracy on the basis of photographic data taken by a spectrum sensor mounted on a movable body such as a vehicle and can process photographic data in real time.

SUMMARY

To achieve the foregoing objective and in accordance, a movable body spectrum measuring apparatus according to the present invention has a spectrum sensor mounted on a movable body, and the spectrum sensor is capable of measuring wavelength information and light intensity information. The movable body spectrum measuring apparatus discriminates a measuring object in the surroundings of the movable body based on spectrum data regarding an observation light detected by the spectrum sensor. The movable body spectrum measuring apparatus includes a first storing unit, a second storing unit, a discrimination level setting unit, a restricting unit, and a discrimination unit. The first storing unit stores, as dictionary data, spectrum data including wavelength information and light intensity information for a plurality of predetermined measuring objects. The second storing unit stores limitation information for limiting wavelength information included in a wavelength region of the spectrum data regarding the observation light to a part of the wavelength information classified based on an attribute of the measuring object. The discrimination level setting unit selectively sets limitation information corresponding to a required discrimination level of the measuring object from the limitation information stored in the second storing unit. The restricting unit restricts the spectrum data regarding the observation light to spectrum data consisting of only the wavelength information limited based on the selectively set limitation information. The discrimination unit discriminates the measuring object based on comparison between the spectrum data restricted by the restricting unit and the spectrum data stored in the first storing unit.

With such a configuration, the wavelength information on the spectrum data regarding the observation light is limited to the spectrum data consisting of only a part of the wavelength information based on the limitation information. Consequently, the amount of data on the wavelength information of the spectrum data is reduced. The discrimination unit compares only the wavelength information included in the restricted spectrum data with the spectrum data regarding the measuring object, thereby reducing the amount of the computation required for the comparison. Thus, for the time necessary for computational processing to be performed for discriminating the measuring object is also reduced spontaneously and the processing related to the discrimination of the measuring object can also be performed based on the spectrum data regarding the observation light in real time. As a result, even when the spectrum measuring apparatus is mounted on the vehicle as the movable body, the vehicle can discriminate the measuring object in real time, thereby increasing the adoptability of the spectrum measuring apparatus for drive assistance requiring real-time processing.

Moreover, reduction in the amount of the spectrum data or the amount of the computation required for discriminating the measuring object results in reduction in storage capacity of a storing device such as a memory, which can simplify configuration of the spectrum measuring apparatus, thereby improving flexibility. Thus, the adoptability of the spectrum measuring apparatus for the movable body is increased.

In accordance with one aspect of the present invention, the wavelength information limited by the limitation information includes at least one of wavelength band information and wavelength resolution information. The wavelength band information is information indicative of a partial wavelength band obtained by reducing a wavelength region of the spectrum data regarding the observation light, and wavelength resolution information is information indicative of a wavelength resolution as the spectrum data.

With such a configuration, the spectrum data regarding the observation light can also be limited by the limitation information including at least one of the wavelength band information indicative of a wavelength region required for the comparison and the wavelength resolution information indicative of a wavelength resolution required for the comparison. The spectrum data thus restricted can adequately maintain precision in the discrimination of the measuring object in the comparison and can reduce the amount of the data.

Moreover, the number of wavelengths used in the comparison can be optionally set based on the wavelength band information or the wavelength resolution information. In addition, in the case where the wavelength band information and the wavelength resolution information are included in the limitation information, it is also possible to optionally set the number of the wavelengths used in the comparison by a combination of the wavelength band information and the wavelength resolution information, thereby increasing the degree of freedom in selection of the time necessary for the discrimination processing of the measuring object.

In accordance with one aspect of the present invention, a required discrimination level of the measuring object is divided into a plurality of hierarchies as discrimination level data, and at least one of the wavelength band information and the wavelength resolution information is respectively caused to correspond to the hierarchized discrimination level data and is stored in the second storing unit.

With such a configuration, the discrimination level determined based on the precision in the discrimination or the like is set hierarchically. Accordingly, the measuring object can be selected by switching among the hierarchies of the discrimination level in the discrimination processing of the measuring object in addition to the selection in the same discrimination level. For example, an upper class is caused to correspond to a rough classification or a schematic classification and a lower class is caused to correspond to a small classification or a detailed classification with respect to the upper class. As a result, when a discrimination level for a measuring object is moved from an upper part to a lower part based on a hierarchical structure, the classification of the measuring object is made fine or a state is known in detail. Thus, the measuring object is spontaneously narrowed down so that the measuring object can also be discriminated quickly. Consequently, in the case where the spectrum measuring apparatus is employed for a vehicle, drive assistance can be rapidly performed.

In accordance with one aspect of the present invention, the wavelength band information or the wavelength resolution information which is respectively caused to correspond to the discrimination level data is separately changed into map data in the second storing unit.

With such a configuration, the wavelength band information and the wavelength resolution information are separately changed into map data, respectively. Therefore, it is also possible to manage the wavelength band information and the wavelength resolution information separately.

By performing the comparison in the order of an array of the measuring object in the map data, it is also possible to set the arrangement order as a priority of the measuring object and to preferentially perform the discrimination of the measuring object having a high priority which is desired for drive assistance or the like, for example. Alternatively, if the array of the map data is adequately set in accordance with the occurrence ratio of a measuring object, it is also possible to reduce the number of the data comparisons for the discrimination of the measuring object, thereby reducing the time necessary for the computation. In any case, it is possible to shorten the time necessary for discriminating the measuring object by the spectrum measuring apparatus, thereby increasing the feasibility still more for real-time processing.

In accordance with one aspect of the present invention, at least one of the wavelength band information and the wavelength resolution information is set in such a manner that spectrum data to be restricted through the restricting unit has an equal data amount in all discrimination levels.

With such a configuration, at least one of the wavelength band information and the wavelength resolution information is set to cause the amounts of the spectrum data to be equal to each other irrespective of the hierarchy of the discrimination level. Accordingly, the amounts of the spectrum data are equal to each other irrespective of the hierarchy of the discrimination level. Consequently, the time necessary for the discrimination processing is made uniform irrespective of the hierarchy of the discrimination level.

In accordance with one aspect of the present invention, the restricting unit restricts spectrum data output from the spectrum sensor such that the restricted spectrum data at least has a wavelength band designated by the wavelength band information or a wavelength resolution designated by the wavelength resolution information.

With such a configuration, also in a large amount of the spectrum data regarding the observation light which is detected by the spectrum sensor, the amount of the data is restricted by the restricting unit. Therefore, the amount of data is reduced, resulting in reduction in the time necessary for computational processing to be performed for discriminating the measuring object. Consequently, it is possible to improve the feasibility of the real-time processing to be performed by the spectrum measuring apparatus.

In accordance with one aspect of the present invention, the movable body is provided with a spectrum sensor control device for causing at least one of an observation wavelength band and an observation wavelength resolution in the spectrum sensor to be variable, and, through the spectrum sensor control device, the restricting unit restricts spectrum data regarding an observation light detected by the spectrum sensor such that the restricted spectrum data has a wavelength band designated by the wavelength band information or a wavelength resolution designated by the wavelength resolution information.

With such a configuration, the spectrum data regarding the observation light which is detected by the spectrum sensor is restricted based on at least one of the wavelength band information and the wavelength resolution information. Accordingly, the amount of data is reduced and the time necessary for a computational discrimination process for a measuring object is reduced, thereby increasing the feasibility for real-time processing to be performed by the spectrum measuring apparatus.

In accordance with one aspect of the present invention, the required discrimination level of the measuring object is automatically updated recursively in accordance with a discrimination content of the measuring object discriminated by the discrimination unit.

With such a configuration, the discrimination level is automatically updated recursively. Accordingly, in the case where the hierarchized discrimination level is moved from an upper class to a lower class, the discrimination of the measuring object can be further divided in more detail and can be made in more detail with the movement of the class. Consequently, the measuring object is spontaneously narrowed down so that the measuring object can be discriminated quickly.

In accordance with one aspect of the present invention, the movable body is further provided with an object detecting device for detecting the measuring object, and a measuring object is set by the spectrum sensor in accordance with the measuring object detected by the object detecting device.

With such a configuration, the discrimination processing is preferentially performed for the measuring object detected by the object detecting device. Accordingly, it is possible to discriminate the measuring object quickly. In addition, it is also possible to omit the processing for recognizing a measuring object having a low occurrence ratio, resulting in reduction in the time necessary for the discrimination processing.

In accordance with one aspect of the present invention, the movable body is provided with an environment information acquiring device for acquiring surrounding environment information, and a measuring object is set by the spectrum sensor in accordance with the environment information acquired by the environment information acquiring device.

With such a configuration, in accordance with the environmental information acquired by the environment information acquiring device, the measuring object having a high occurrence ratio or the measuring object having a high priority is preferentially subjected to the discrimination processing, for example. This enables the discrimination of the measuring object quickly. Consequently, the recognition processing of the measuring object having a low occurrence ratio is omitted, thereby reducing the time necessary for the discrimination processing.

In accordance with one aspect of the present invention, the environment information acquired by the environment information acquiring device is at least one of weather information and position information of the movable body.

With such a configuration, when the acquired environment information is weather information, by increasing the priority of an umbrella, a puddle or the wet measuring object that has a high occurrence ratio in the case of rainy weather and has a low priority in the case of sunny weather, the measuring object can be discriminated quickly. When the environmental information is position information of the movable body, by setting the measuring object to have a high priority for an automobile or a white line on a road in the case of motor highways, a road in the case of agricultural fields, a person or a traffic light in the case of urban areas and a person, especially, a child or an older person in the case of residential streets, the measuring object can be discriminated quickly.

In accordance with one aspect of the present invention, the movable body is provided with an intended purpose selecting device for selecting an intended purpose of the spectrum sensor, and a measuring object is set by the spectrum sensor in accordance with the intended purpose selected through the intended purpose selecting device.

With such a configuration, the measuring measures set by the intended purpose selecting device can be preferentially discriminated. Thus, by preferentially discriminating the measuring object requiring assistance of the spectrum measuring apparatus in the movable body, the measuring object can be discriminated quickly. Furthermore, the recognition processing of the measuring object having a low occurrence ratio is omitted, thereby reducing the time necessary for the discrimination processing.

In accordance with one aspect of the present invention, the intended purpose selecting device includes a group of selecting switches to be manually operated by a driver of the movable body, and a measuring object selected through the selecting switch group is set as a measuring object through the spectrum sensor.

With such a configuration, assistance can be performed by the spectrum measuring apparatus at a request of a driver, and it is also possible to discriminate the measuring object quickly by preferentially performing the discrimination processing over a measuring object having a high priority for the driver.

In accordance with one aspect of the present invention, the movable body is provided with a drive assistance system for assisting driving, and the intended purpose selecting device selects a measuring object to meet an intended purpose in cooperation with the drive assistance system.

With such a configuration, by preferentially discriminating the measuring object having a high priority, which is determined according to the intended purpose of the drive assistance system, the measuring object can be discriminated quickly. Further, recognition processing for a measuring object having a low occurrence ratio is omitted, thereby reducing the time necessary for the discrimination processing. For example, when drive assistance is performed by adaptive cruise control (ACC) to control a distance from the vehicle ahead, an automobile is selected as the measuring object having a high priority. When drive assistance is performed by lane keeping assistance control (LKA) to control a lane for the vehicle, a white line on the road surface is selected as the measuring object having a high priority. When drive assistance is performed by on-vehicle night vision device (night view), a pedestrian is selected as the measuring object having a high priority. Consequently, the measuring object is discriminated in cooperation with a drive assistance system in this manner to attain an object of the assistance. This increases the adoptability of the movable body spectrum measuring apparatus.

In accordance with one aspect of the present invention, the movable body is provided with a moving state acquiring device for acquiring information on a moving state of the movable body, and a measuring object is set by the spectrum sensor in accordance with the moving state of the movable body which is acquired by the moving state acquiring device.

With such a configuration, by preferentially discriminating the measuring object having a high priority, which is determined according to the moving state acquired by the moving state acquiring device, the measuring object can be discriminated quickly. Furthermore, the recognition processing of the measuring object having a low occurrence ratio is omitted, thereby reducing the time necessary for the discrimination processing.

In accordance with one aspect of the present invention, information on the moving state of the movable body, which is acquired by the moving state acquiring device, is at least one of speed information, acceleration information, and steering information of the movable body.

With such a configuration, a measuring object having a high priority is determined based on speed information, acceleration information or steering information of the movable body. For example, by changing a discrimination level based on the speed information or the acceleration information, the discrimination processing can be finished within a predetermined period. Further, on the basis of the steering information, the measuring object can be set to the car in the case of driving across a motorway and to the pedestrian in the case of driving across a sidewalk.

According to an aspect of the present invention, the movable body is an automobile driving on a road surface.

With such a configuration, even the spectrum measuring apparatus mounted on the automobile can recognize the measuring object that sequentially approaches during driving on the road in real time to achieve adequate drive assistance. This increases the adoptability of the spectrum measuring apparatus in the automobile.

BRIEF DESCRIPTION OF THE DRAWINGS

FIG. 5 is a table showing an example of a hierarchical state of a discrimination level in the first embodiment;

FIG. 6 is a map showing an example of a wavelength region map in the first embodiment;

FIG. 7 is a map showing an example of a wavelength resolution map in the first embodiment;

DETAILED DESCRIPTION OF THE PREFERRED EMBODIMENTS (First Embodiment)

A movable body provided with a movable body spectrum measuring apparatus according to a first embodiment of the present invention will be described with reference to FIGS. 1 to 9.

Figure 1:
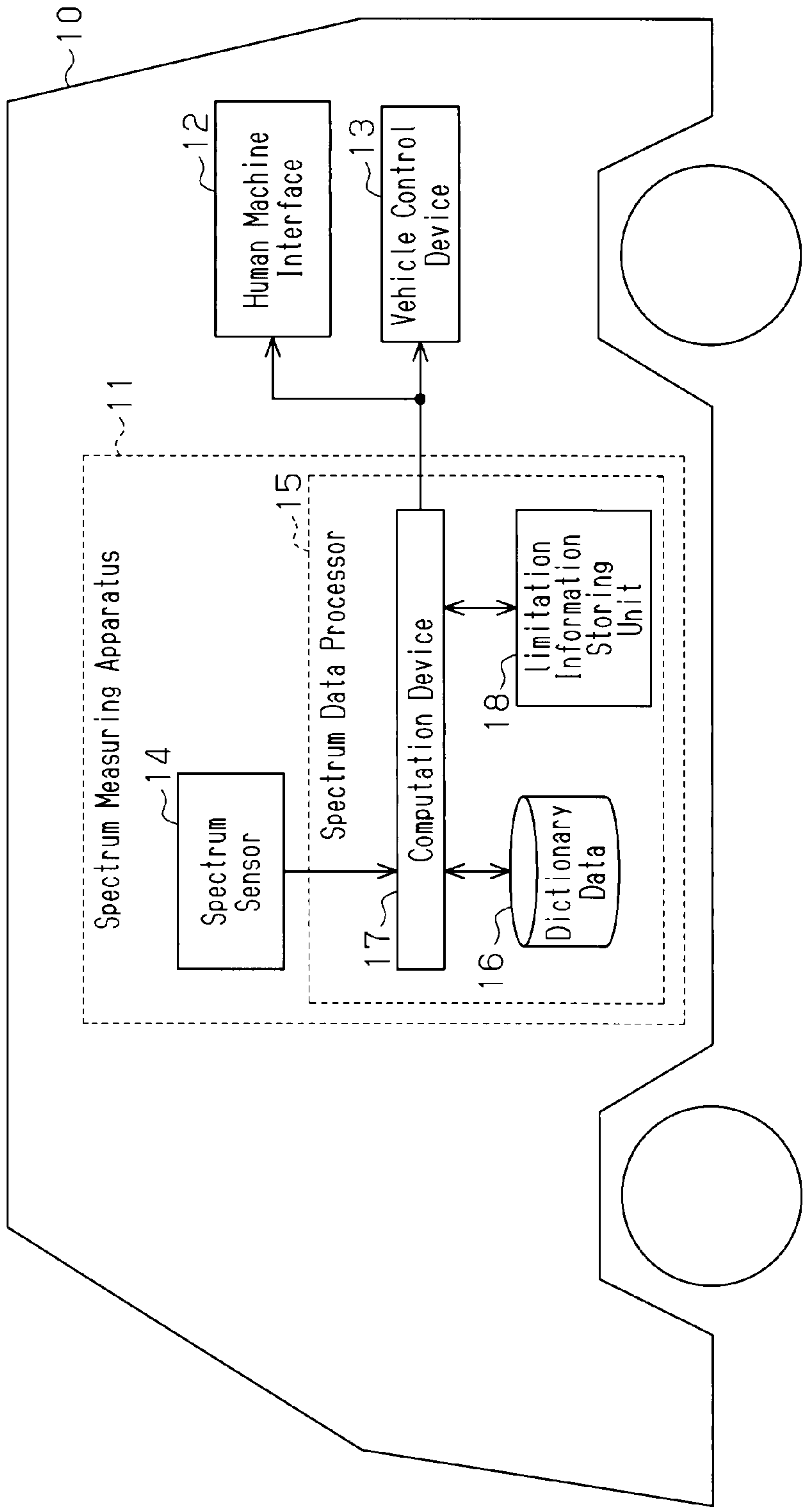
FIG. 1 is a block diagram showing a movable body according to a first embodiment provided with a movable body spectrum measuring apparatus of the present invention.

FIG. 1 is a diagram showing the schematic configuration of functions of the movable body spectrum measuring apparatus provided on a vehicle as a movable body including the apparatus. As shown in FIG. 1, a vehicle 10 is provided with a spectrum measuring apparatus 11 for acquiring optical information including visible light and nonvisible light outside of the vehicle, a human machine interface 12 for transmitting the information output from the spectrum measuring apparatus 11 to an occupant of the movable body and a vehicle control device 13 for reflecting the information output from the spectrum measuring apparatus 11 in vehicle control.

The human machine interface 12 is a publicly-known interface device that transmits the state of the vehicle to the occupant, in particular, a driver through light, color, sound or the like, and is provided with an operating device such as a push button or a touch panel so as to transmit the occupant's decision to the vehicle control device 13 or the like via a button or the like.

The vehicle control device 13 is one of control devices mounted on the vehicle and is a device such as an engine control device, which is connected to other various control devices mounted on the vehicle directly or via an on-vehicle network and can communicate necessary information with each other. In this embodiment, the vehicle control device 13 transmits input information for an object discriminated by the spectrum measuring apparatus 11 to the other various control devices and allows the vehicle 10 to perform drive assistance as required according to the discriminated measuring object.

The spectrum measuring apparatus 11 is provided with a spectrum sensor 14 for detecting spectrum data regarding observation light and a spectrum data processor 15 for receiving the spectrum data regarding the observation light, which is detected by the spectrum sensor 14, and processing the data. The spectrum sensor 14 separates the observation light consisting of visible light and nonvisible light into predetermined wavelength bands. Then, the observation light is output as spectrum data configured of wavelength information indicating each wavelength forming the wavelength band by the light separation and light intensity information indicating the light intensity of the separated observation light at each wavelength. The spectrum sensor 14 may measure the wavelength information and the light intensity information at the same time or may measure the information as necessary.

Figure 2:
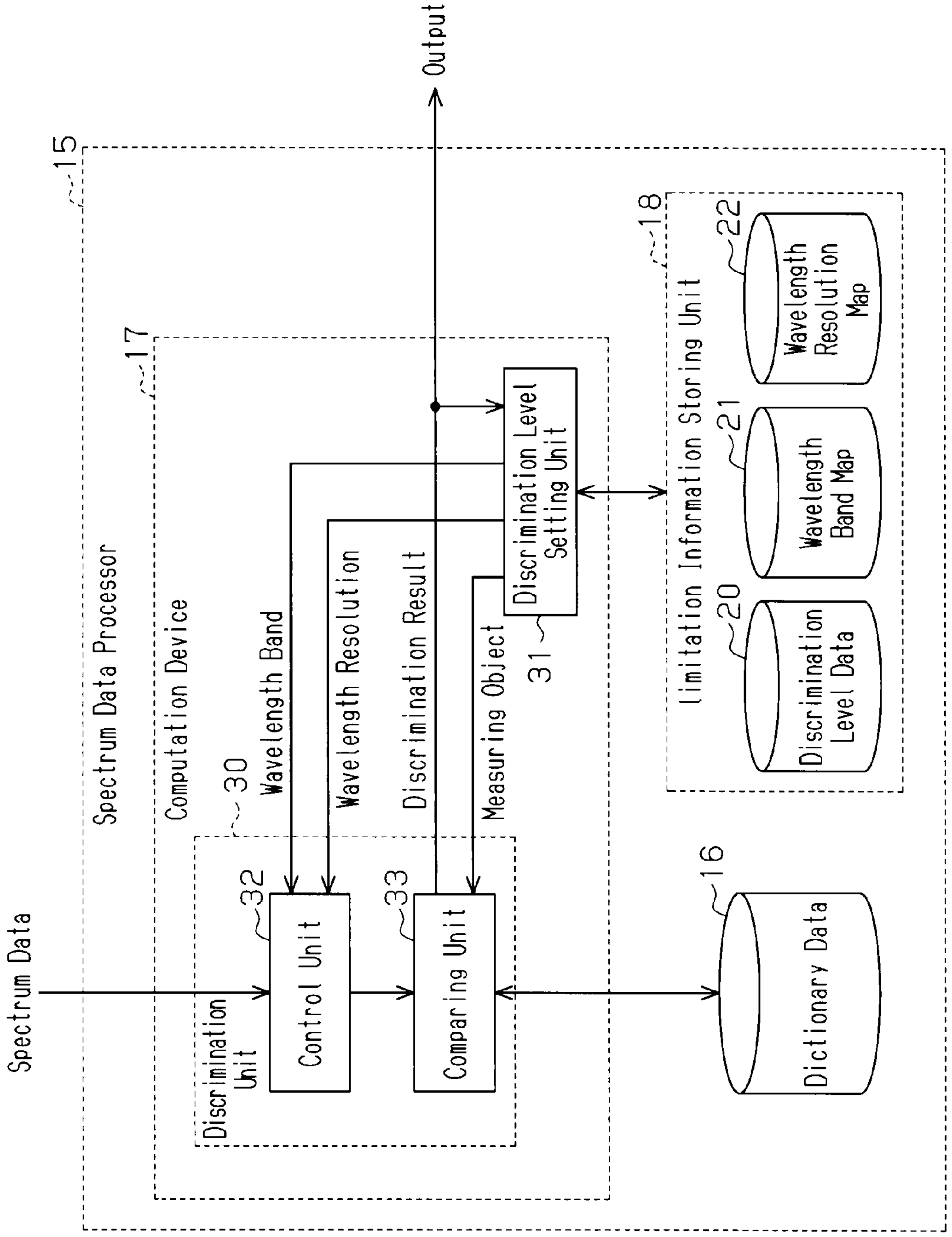
FIG. 2 is a block diagram showing a functional block of the spectrum measuring apparatus in the first embodiment.

Next, the spectrum data processor 15 will be described with reference to FIG. 2. FIG. 2 is a diagram showing a detailed block structure of the spectrum data processor 15.

The spectrum data processor 15 mainly includes a microcomputer having, for example, a computation device and a storing device. The spectrum data regarding the observation light, which is detected by the spectrum sensor 14, is input into the spectrum data processor 15. By discriminating the observed measuring object based on the input spectrum data regarding the observation light and outputting a result, the spectrum data processor 15 outputs the result to the human machine interface 12 and the vehicle control device 13. The spectrum data processor 15 is provided with a dictionary data storing unit 16 for storing spectrum data regarding each of the plurality of measuring objects as dictionary data therein and an computation device 17 for discriminating the measuring object based on a comparison computation for comparing the spectrum data regarding the measuring object as dictionary data with the spectrum data regarding the observation light. Moreover, the spectrum data processor 15 is provided with limitation information storing unit 18 for storing limitation information for reducing the amount of computational processing in the comparison computation in the computation device 17.

The dictionary data storing unit 16 is formed by all or part of a storage area provided in a publicly-known storing device and stores the spectrum data as dictionary data in the storage area. The dictionary data consists of pieces of the spectrum data regarding the measuring objects as the objects to be discriminated and is previously prepared for the number of measuring objects to be discriminated. That is, the storage area as the dictionary data storing unit 16 may be configured of storage areas of one or more storing device(s) so as to satisfy a storage capacity capable of storing the previously prepared plurality of dictionary data.

The spectrum data as dictionary data has the wavelength information and the light intensity information. For example, data regarding one measuring object as dictionary data includes the light intensity information found by dividing the wavelength band that can be measured by the spectrum sensor by a wavelength resolution of the spectrum sensor and the corresponding wavelength information, which forms a pair, and the amount of data is large. For example, given that the wavelength band to be used in the comparison computation is 400 nm to 2500 nm and the wavelength resolution is 5 nm, the spectrum data regarding one measuring object contains 420 pairs of the wavelength information and the light intensity information.

Figure 3A:
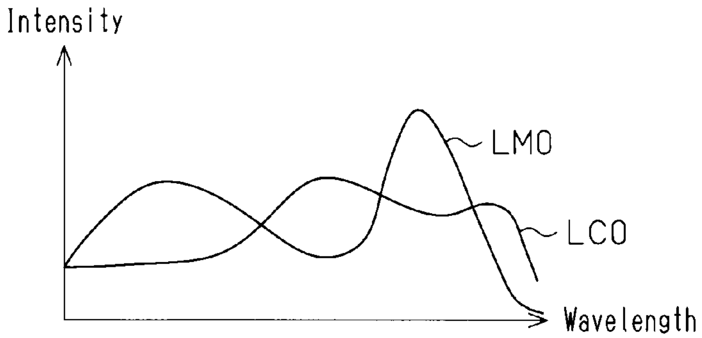
FIG. 3 are graphs showing a spectrum waveform as dictionary data in the first embodiment, where FIG. 3(*a*) shows a spectrum waveform with a low resolution, FIG. 3(*b*) shows a spectrum waveform with an almost middle resolution and FIG. 3(*c*) shows a spectrum waveform with a high resolution.
Figure 3B:
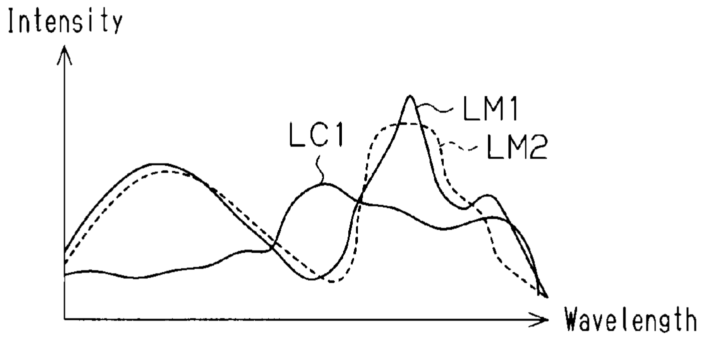
Figure 3C:
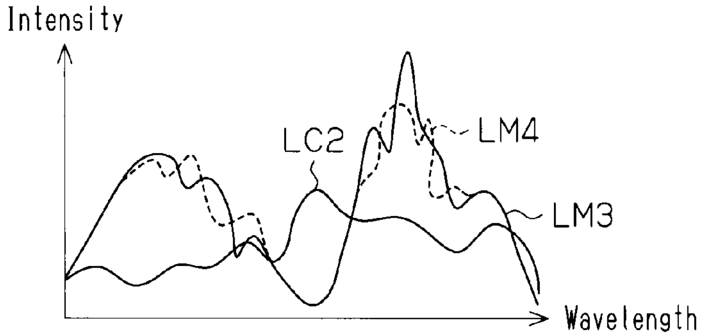
Figure 4:
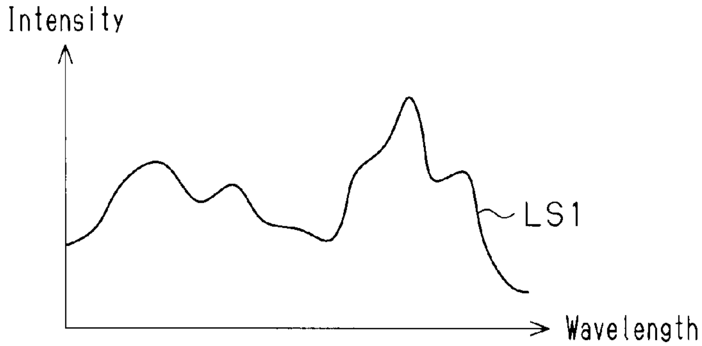
FIG. 4 is a graph showing an example of spectrum data for an observation light which is output from a spectrum sensor in the first embodiment.

FIG. 3 shows an example of the spectrum data as dictionary data. FIG. 3 are graphs showing the spectrum data having a plurality of wavelength resolutions, and FIG. 3(*a*) is a graph showing the case where the resolution is low, FIG. 3(*b*) is a graph showing the case where the resolution is medium and FIG. 3(*c*) is a graph showing the case where the resolution is high. In FIG. 3(*a*), a graph LM0 shows an example of spectrum data in the case where a measuring object is "person" and a graph LC0 shows an example of spectrum data in the case where the measuring object is "car". In FIG. 3(*b*), a graph LM1 shows an example of spectrum data in the case where the measuring object is "small person", a graph LM2 shows an example of the spectrum data in the case where the measuring object is "large person", and a graph LC1 shows an example of the spectrum data in the case where the measuring object is "station wagon type car". In FIG. 3(*c*), a graph LM3 shows an example of the spectrum data in the case where the measuring object is "child", a graph LM4 shows an example of the spectrum data in the case where the measuring object is "adult", and a graph LC2 shows an example of the spectrum data in the case where the measuring object is "ambulance". Thus, if the measuring object is "person", it also includes "child", "adult" or the like which is subdivided in addition thereto. Dictionary data as spectrum data for discriminating the measuring objects is provided. If the measuring object is "car", "ambulance" or the like which is classified more finely in addition thereto is also the object. Dictionary data as each spectrum data is provided to discriminate the measuring objects.

As shown in FIG. 2, the computation device 17 is provided with a discrimination unit 30 for discriminating a measuring object based on spectrum data regarding an observation light and outputting a result of the discrimination, and a discrimination level setting unit 31 for giving the discrimination unit limitation information for limiting the amount of a comparison computation. The discrimination unit 30 is provided with a restricting unit 32 for directly inputting the spectrum data regarding the observation light, and a comparing unit 33 for comparing the spectrum data sent from the restricting unit 32 with dictionary data sent from the dictionary data storing unit 16. Moreover, the limitation information storing unit 18 is provided with a discrimination level data storing unit 20, a wavelength band map storing unit 21 and a wavelength resolution map storing unit 22.

The discrimination level data storing unit 20 of the limitation information storing unit 18 retains discrimination level data. The discrimination level data is obtained by disposing a discrimination level required for discriminating a measuring object with a classification into a plurality of hierarchies.

Next, a relationship between the discrimination level in the discrimination level data and the measuring object will be descried with reference to FIG. 5. FIG. 5 shows a discrimination level map 25 as an example embodying the discrimination level data. As shown in FIG. 5, a discrimination level having the highest hierarchy is set to be a discrimination level 1, a discrimination level having a lower hierarchy is set to be a discrimination level 2, a discrimination level having a further lower hierarchy is set to be a discrimination level 3, and a discrimination level having the lowest hierarchy is set to be a discrimination level 4. In this embodiment, the hierarchization is performed in accordance with a wavelength resolution in such a manner that a discrimination level having a low wavelength resolution is set to have a high hierarchy and a discrimination level having a high wavelength resolution is set to have a low hierarchy. In this embodiment, for convenience of explanation, a discrimination level having a relatively high hierarchy is indicated as a higher discrimination level and a discrimination level having a relatively low hierarchy is indicated as a lower discrimination level. Consequently, a lower discrimination level has a lower hierarchy with respect to the higher discrimination level and a higher wavelength resolution. Description will be given by using an example of the dictionary data. The higher discrimination level is required for the measuring object of "person" or "car" shown in FIG. 3(*a*), a lower discrimination level is required for the measuring object of "small person", "large person" or "station wagon type car" shown in FIG. 3(*b*), and a further lower discrimination level is required for the measuring object of "child", "adult" or "ambulance" shown in FIG. 3(*c*).

By using the discrimination level map 25 shown in FIG. 5, description will be given of a hierarchical arrangement of the measuring object. In this embodiment, a measuring object classified roughly or schematically is arranged in a higher hierarchy shown in the discrimination level map 25, and a measuring object obtained by classifying the high-order measuring object finely or in detail is arranged in a lower hierarchy. Such a relationship is applied between two discrimination levels which are higher and lower classes, respectively. In other words, it is possible to discriminate the measuring object discriminated based on the discrimination level 1 into a more detailed measuring object through a further discrimination based on the discrimination level 2. As compared with the case where a comparison computation is performed to discriminate any of the measuring objects with high precision from the beginning at this time, the amount of the computation is reduced so that the measuring objects are spontaneously discriminated quickly. This is the same between the discrimination level 2 and the discrimination level 3 and between the discrimination level 3 and the discrimination level 4.

Detailed description will be given. As measuring objects classified roughly, "animal", "plant", "artifact", "others" and the like are set to the discrimination level 1 in the discrimination level map 25. Measuring objects obtained by classifying "animal" or the like in the discrimination level 1 in detail are set to the discrimination level 2. For example, "person", "dog", "cat", "deer", "wild boar" and the like are set as the measuring objects obtained by classifying "animal" in detail. Moreover, measuring objects obtained by classifying "person" or the like in the discrimination level 2 are set to the discrimination level 3. For example, "Asian", "American", "European" and the like are set as measuring objects obtained by measuring "person" in detail. For example, measuring objects obtained by classifying "Asian" or the like regarding the discrimination level 3 in detail are set to discrimination level 4. For example, "older person", "adult", "child", "disabled person" and the like are set as the measuring objects obtained by classifying "Asian" in detail.

Also in the case where high precision in a discrimination is required through the discrimination level map 25, for example, a comparison computation with any of the measuring objects set to the discrimination level 4 is not performed but the discrimination is started from the discrimination level 1 and the discrimination is performed in the same discrimination level, a transition to the discrimination level 2 is made. Thus, a transition to a lower discrimination level is sequentially made so that a discrimination having a high efficiency can be performed.

As shown in FIG. 6, a wavelength band map 26 is retained in the wavelength band map storing unit 21 of the limitation information storing unit 18. The wavelength band map 26 sets a wavelength band to be used in the comparison computation for discriminating a measuring object, and a wavelength band used in the discrimination is determined for each measuring object. Only a characteristic one of the wavelength bands is extracted as spectrum data in a corresponding form to precision in the discrimination and is caused to be used in the comparison computation. For this reason, the widest wavelength band is set to the measuring object corresponding to the discrimination level 1, and the wavelength band is set to be sequentially reduced toward a lower class in the order of the discrimination level 2, the discrimination level 3 and the discrimination level 4. More specifically, in the discrimination level 1, a wavelength band of 400 nm to 2500 nm is set to any of the measuring objects which are set into the same level. In the discrimination level 2, a wavelength band of 400 nm to 1500 nm is set to "person" to be the measuring object set into the same level and a wavelength band of 500 nm to 2000 nm is set to "dog". In the discrimination level 3, wavelength bands of 400 nm to 800 nm and 1000 nm to 1300 nm are set to "Asian" to be the measuring object set into the same level, and wavelength bands of 400 nm to 900 nm and 1000 nm to 1500 nm are set to "American". In the discrimination level 4, a wavelength band of 1000 nm to 1450 nm is set to "older person" to be the measuring object set into the same level and a wavelength band of 900 nm to 1400 nm is set to "adult". In other words, the wavelength band is set to be sequentially reduced toward a lower hierarchy of the discrimination level.

As shown in FIG. 7, a wavelength resolution map 27 is retained in the wavelength resolution map storing unit 22 of the limitation information storing unit 18. The wavelength resolution map 27 sets a wavelength resolution to be used when discriminating a measuring object, and a wavelength resolution used in the discrimination for each discrimination level is determined for each measuring object in this embodiment. The wavelength resolution of the discrimination level 1 is set to be the roughest and the wavelength resolution is set to be gradually finer toward a lower class in the order of the discrimination level 2, the discrimination level 3 and the discrimination level 4 in order to discriminate the wavelength resolutions roughly in a higher discrimination level and to discriminate them in more detail in a lower discrimination level. More specifically, a wavelength resolution of 100 nm is set to the discrimination level 1, a wavelength resolution of 50 nm is set to the discrimination level 2, a wavelength resolution of 10 nm is set to the discrimination level 3, and a wavelength resolution of 5 nm is set to the discrimination level 4.

Consequently, in the case where the limitation information is used, a band of 400 nm to 2500 nm is discriminated with a resolution of 100 nm in the discrimination level 1 and the number of wavelengths to be used in the discrimination is 21 (=(2500−400)/100). Similarly, in the case of "person" in the discrimination level 2, a band of 400 nm to 1500 nm is discriminated with a resolution of 50 nm and the number of wavelengths to be used in the discrimination is 22 (=(1500−400)/50). Similarly, in the case of "Asian" in the discrimination level 3, bands of 400 nm to 800 nm and 1000 nm to 1300 nm are discriminated with a resolution of 10 nm and the number of wavelengths to be used in the discrimination is 70 (=((800−400)+(1300−1000))/10). Similarly, in the case of "older person" in the discrimination level 4, a band of 1000 nm to 1450 nm is discriminated with a resolution of 5 nm and the number of wavelengths to be used in the discrimination is 90 (=(1450−1000)/5). The numbers of the wavelengths to be used in the discrimination seem to have a variation. However, the number of the wavelengths required for the discrimination is made uniform to considerably reduce the amount of the computation. This is apparent because the number of the wavelengths to be used in the discrimination is 420 (=(2500−400)/5) for a single measuring object in the case where the wavelength band of 400 nm to 2500 nm is discriminated with the wavelength resolution of 5 nm in order to discriminate the measuring object with precision of the discrimination level 4 from the beginning.

As shown in FIG. 2, the discrimination level setting unit 31 selects a measuring object in accordance with a result of the discrimination of the discrimination unit 30 and gives the discrimination unit 30 wavelength band information and wavelength resolution information which are set to enable the discrimination of the measuring object in a small amount of computation. In other words, the discrimination level setting unit 31 selects the measuring object from the discrimination level map 25 of the discrimination level data storing unit 20 in the limitation information storing unit 18 and acquires wavelength band information corresponding to the selected measuring object from the wavelength band map 26 of the wavelength band map storing unit 21. Furthermore, the discrimination level setting unit 31 acquires corresponding wavelength resolution information from the wavelength resolution map 27 of the wavelength resolution map storing unit 22. The discrimination level setting unit 31 outputs the selected measuring object and the acquired wavelength band information and wavelength resolution information to the discrimination unit 30.

The spectrum data regarding the observation light is input into the restricting unit 32 of the discrimination unit 30 as described above, and the wavelength band information and the wavelength resolution information are input thereto from the discrimination level setting unit 31. The spectrum data regarding the observation light shown in FIG. 4 that is detected by the spectrum sensor 14 is input into the restricting unit 32, for example. A graph LS1 indicates spectrum data regarding an observation light which is detected when the measuring object is "child". The restricting unit 32 restricts the input spectrum data regarding the observation light to spectrum data having only a wavelength region determined by the wavelength band information through the wavelength resolution defined based on the wavelength resolution information. Consequently, even an enormous amount of spectrum data regarding an observation light is restricted to spectrum data in the amount determined by the limitation information.

The comparing unit 33 determines the agreement between the spectrum data based on the observation light and the spectrum data based on the measuring object, and discriminates that the spectrum data based on the observation light is the measuring object if both of the spectrum data agree and determines that the spectrum data based on the observation light is not the measuring object if they do not agree. In this embodiment, the agreement is determined based on a comparison computation for comparing both of the spectrum data with each other. However, a computation technique used in determining the agreement between both of the spectrum data may be any of various computation techniques to be used in the well-known image recognition technology or data processing technology.

The spectrum data restricted by the restricting unit 32 and information on the measuring object, which is sent from the discrimination level setting unit 31 are input into the comparing unit 33. The comparing unit 33 acquires, from the dictionary data storing unit 16, dictionary data as the spectrum data regarding the measuring object which is input. Then, the restricted spectrum data is compared with light intensity information on only a wavelength included in the dictionary data, that is, the restricted spectrum data. Consequently, a small amount of the comparison computation is performed based on a small amount of the restricted spectrum data. Thus, the time necessary for the comparison computation can be shortened. Because of the small amount of computation, the storage capacity of a storing unit such as a memory required for the computation is also reduced so that the configuration of the comparing unit 33 can also be simplified and flexible.

Figure 8:
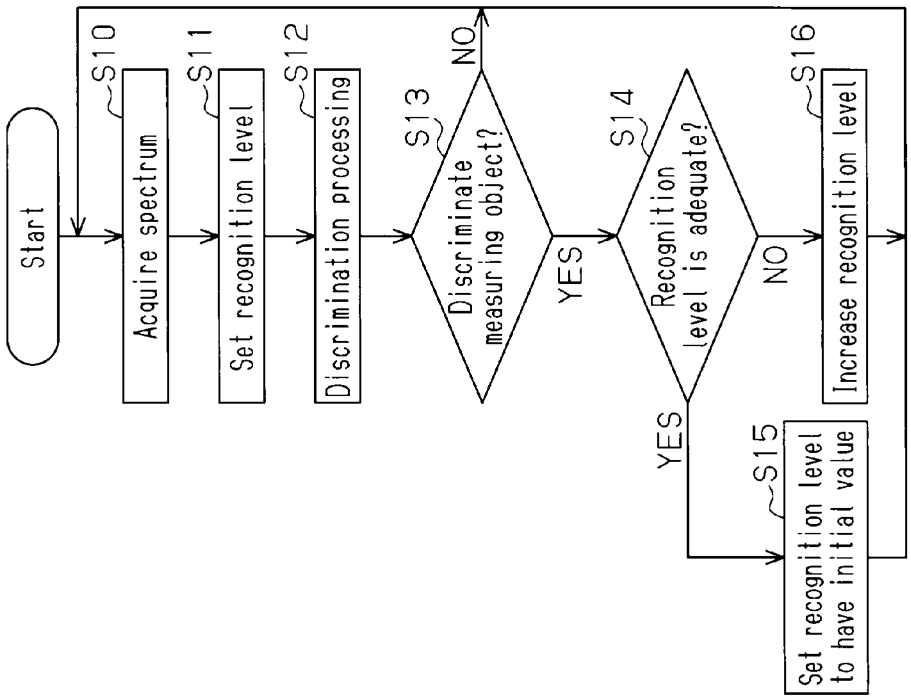
FIG. 8 is a flowchart showing discrimination processing in the first embodiment.
Figure 9A:
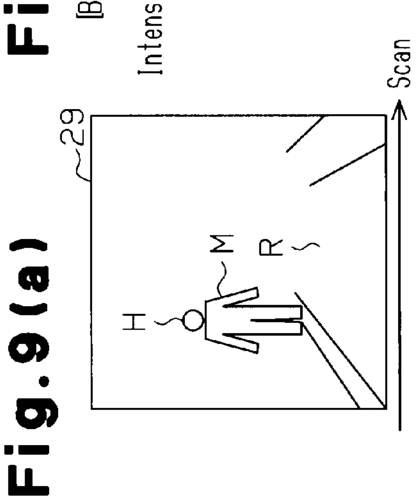
FIG. 9 are diagrams for describing the discrimination processing in the first embodiment, where FIG. 9(*a*) is a view showing a visible state of a measuring object, FIG. 9(*b*) is a graph showing a spectrum of the measuring object in the case of a wide wavelength region and a low wavelength resolution, FIG. 9(*c*) is a graph showing a spectrum of the measuring object in the case of a middle wavelength region and a middle wavelength resolution, and FIG. 9(*d*) is a graph showing a spectrum of the measuring object in the case of a narrow wavelength region and a high wavelength resolution.
Figure 9B:
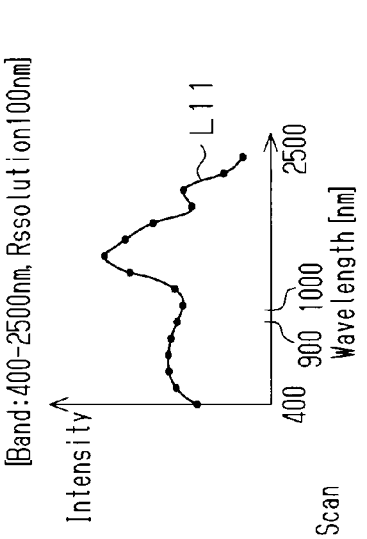
Figure 9C:
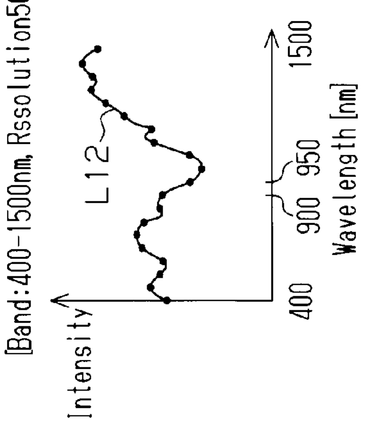
Figure 9D:
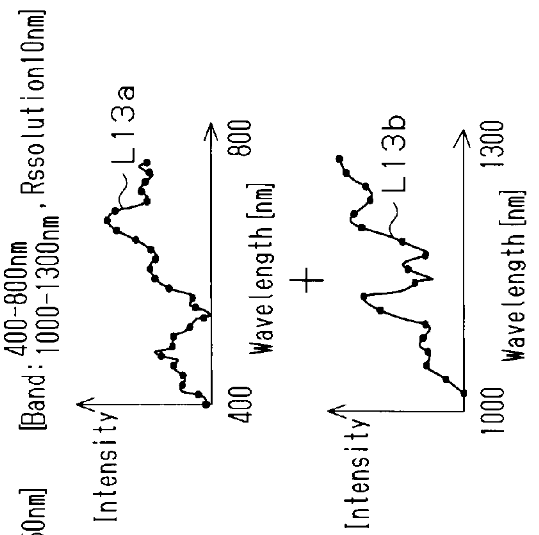

Next, the discrimination of the measuring object in the spectrum measuring apparatus will be described with reference to FIG. 8. FIG. 8 is a flowchart showing the discrimination processing of a measuring object which is to be performed by the spectrum measuring apparatus.

The spectrum measuring apparatus 11 is brought into an operating state through power activation of a vehicle or the like and the spectrum data processor 15 performs the discrimination processing of a measuring object based on the spectrum data regarding the observation light which is detected by the spectrum sensor 14. In other words, the spectrum data processor 15 acquires the spectrum data regarding the observation light which is input into the computation device 17 as required (Step S10 in FIG. 8). Subsequently, the discrimination level setting unit 31 of the spectrum data processor 15 selects a recognition level for discriminating the spectrum data and a measuring object in the discrimination level, inputs a wavelength band and a wavelength resolution which correspond to the selected measuring object to the restricting unit 32, and inputs the selected measuring object to the comparing unit 33. Consequently, the restricting unit 32 of the spectrum data processor 15 sets the spectrum data regarding the observation light into spectrum data restricted based on the wavelength band and the wavelength resolution (Step S11 in FIG. 8). The comparing unit 33 of the spectrum data processor 15 acquires dictionary data corresponding to the input measuring object from the dictionary data storing unit 16 and compares the dictionary data with the restricted spectrum data, thereby determining the agreement between both of the data (Step S13 in FIG. 8). When it is determined that both of the data thus compared do not agree (NO in the Step S13 of FIG. 8), the comparing unit 33 outputs information indicating that the measuring object has not been discriminated. Based on the information indicating that the discrimination has not been established, the discrimination level setting unit 31 sets to select a next measuring object without changing the discrimination level. Thereafter, the discrimination processing returns to the Step S10.

On the other hand, when it is determined that both of the data compared with each other agree (YES in the Step S13 of FIG. 8), the comparing unit 33 outputs information indicating that the measuring object has been discriminated. Based on the information indicating that the discrimination is performed, the discrimination level setting unit 31 determines whether the discrimination level is adequate or not (Step S14 in FIG. 8). For example, if the discrimination of the measuring object is performed in the discrimination level 4, it is determined that the discrimination level is adequate. On the other hand, if the discrimination of the measuring object is performed in a discrimination level other than the discrimination level 4, it is determined that the discrimination level is inadequate.

When it is determined that the discrimination level is adequate (YES in the Step S14 of FIG. 8), the discrimination level setting unit 31 of the spectrum data processor 15 returns the discrimination level into an initial value, for example, the discrimination level 1 (Step S15 in FIG. 8), the discrimination of the measuring object is performed from the highest discrimination level. In other words, the measuring object is discriminated in detail at a maximum. For this reason, the discrimination is not required any more. Therefore, the measuring object returns to an initial condition. Then, the discrimination processing returns to the Step S10.

On the other hand, when it is determined that the discrimination level is inadequate (NO in the Step S14 of FIG. 8), the discrimination level setting unit 31 of the spectrum data processor 15 changes the discrimination level into a lower discrimination level (Step S16 in FIG. 8) and selects a next measuring object. Then, the discrimination processing returns to the Step S10.

By the discrimination processing, the measuring object is discriminated in more detail, and furthermore, it is repeated to newly start to discriminate the measuring object roughly when the detailed discrimination is ended.

Next, the discrimination of the measuring object in the discrimination processing will be described with reference to FIG. 9. FIG. 9 are diagrams for describing a state in which the discrimination is performed, and FIG. 9(*a*) shows a visible state of a measuring object, FIG. 9(*b*) is a graph showing spectrum data regarding a measuring object in a higher discrimination level, FIG. 9(*c*) is a graph showing spectrum of a measuring object in a lower discrimination level than FIG. 9(*b*), and FIG. 9(*d*) is a graph showing spectrum of a measuring object in a lower discrimination level than FIG. 9(*c*).

Description will be given of the discrimination of the measuring object in the case where a landscape 29 forward of a vehicle is scanned so that spectrum data regarding a head portion H of a pedestrian M standing on a left side on a road R is acquired as spectrum data regarding an observation light as shown in FIG. 9(*a*), for example. The discrimination level 1 is set at first. Therefore, the restricting unit 32 sets the spectrum data regarding the observation light as spectrum data L11 restricted into a wavelength band of 400 nm to 2500 nm having a wavelength resolution of 100 nm shown in FIG. 9(*b*). The comparing unit 33 compares the spectrum data L11 with the spectrum data regarding the measuring object corresponding to the discrimination level 1 and discriminates a measuring object that agrees with the discrimination level 1. Herein, it is assumed that the measuring object is discriminated as “animal”.

When the measuring object is discriminated as “animal”, the discrimination level is changed into the discrimination level 2. Then, the restricting unit 32 sets the spectrum data regarding the observation light into spectrum data L12 restricted into a wavelength band of 400 nm to 1500 nm having a wavelength resolution of 50 nm shown in FIG. 9(*c*). The comparing unit 33 compares the spectrum data L12 with spectrum data regarding a measuring object corresponding to the discrimination level 2 and discriminates a measuring object that agrees with the discrimination level 2. Herein, it is assumed that the measuring object is discriminated as “person”.

When the measuring object is discriminated as “person”, the discrimination level is changed into the discrimination level 3. Then, the restricting unit 32 sets the spectrum data regarding the observation light into spectrum data L13*a* and L13*b* restricted into wavelength bands of 400 nm to 800 nm and 1000 nm to 1300 nm which have a wavelength resolution of 10 nm shown in FIG. 9(*c*). The comparing unit 33 compares the spectrum data L12 with spectrum data regarding a measuring object corresponding to the discrimination level 3, thereby discriminating a measuring object that agrees with the discrimination level 3.

Thus, also in the case where a large amount of spectrum data regarding an observation light which is obtained by using the spectrum sensor is used, it is possible to prevent an increase in the time necessary for the discrimination processing and to improve the precision in the discrimination.

As described above, according to the movable body spectrum measuring apparatus in accordance with this embodiment, it is possible to produce the advantages listed below.

(1) Wavelength information concerning spectrum data regarding a measuring object is restricted to spectrum data including only a part of the wavelength information based on limitation information by the restricting unit 32. Consequently, the amount of data is reduced. The comparing unit 33 of the discrimination unit 30 compares only the wavelength information included in the restricted spectrum data with the spectrum data regarding the measuring object, thereby reducing the amount of a computation required for the comparison. Consequently, the time necessary for computational processing to be performed for discriminating a measuring object is also reduced spontaneously so that processing related to the discrimination of the measuring object can also be performed based on the spectrum data regarding the observation light in real time. As a result, even when the spectrum measuring apparatus is mounted on a vehicle as a movable body, a measuring object can be discriminated in real time by the vehicle. Thus, it is possible to increase the adoptability of the spectrum measuring apparatus for drive assistance requiring real-time processing.

(2) Reduction in the amount of the spectrum data and reduction in the amount of the computation required for discriminating the measuring object reduces a storage capacity of a storing device such as a memory of the spectrum data processor 15. Accordingly, the configuration of the discrimination unit 30 or the like is simplified to improve flexibility. Thus, the adoptability of the spectrum measuring apparatus for the movable body is increased.

(3) The spectrum data regarding the observation light is limited by the limitation information including the wavelength band information indicative of a wavelength region required for the comparison and the wavelength resolution information indicative of a wavelength resolution required for the comparison. The spectrum data thus restricted can adequately maintain precision in the discrimination of the measuring object in the comparison and can reduce the amount of the data.

(4) By combining the wavelength band information and the wavelength resolution information, it is also possible to optionally set the number of the wavelengths used in the comparison, thereby increasing the degree of freedom in selection of the time necessary for the discrimination processing of a measuring object.

(5) The discrimination level determined based on the precision in the discrimination or the like is set hierarchically by the discrimination level map 25. Accordingly, the measuring object can be selected by switching among the hierarchies of the discrimination level in the discrimination processing of the measuring object in addition to the selection in the same discrimination level. For example, an upper class is caused to correspond to a rough classification or a schematic classification and a lower class is caused to correspond to a small classification or a detailed classification with respect to the upper class. Consequently, when a discrimination level for a measuring object is moved from an upper part to a lower part based on hierarchical structure, the classification of the measuring object is made fine or a state is known in detail. Thus, the measuring object is spontaneously narrowed down so that the measuring object can also be discriminated quickly. Consequently, in the case where the spectrum measuring apparatus is employed for a vehicle, drive assistance can be rapidly performed.

(6) The wavelength band information is changed into map data as the wavelength band map 26 and the wavelength resolution information is changed into map data as the wavelength resolution map 27, that is, they are separately changed into the map data respectively. Accordingly, it is also possible to separately manage the wavelength band information and the wavelength resolution information.

(7) By performing the comparison in the order of an array of the measuring object in the discrimination level map 25, it is also possible to set arrangement order as a priority of the measuring object. For example, it is also possible to preferentially perform the discrimination of the measuring object having a high priority which is desired for drive assistance or the like. Alternatively, if the array of the map data is adequately set in accordance with the occurrence ratio of a measuring object, it is also possible to reduce the number of the data comparisons till the discrimination of the measuring object, thereby reducing the time necessary for the computation. In any case, it is possible to shorten the time necessary for discriminating the measuring object by the spectrum measuring apparatus, thereby increasing the feasibility of the real-time processing still more.

(8) Irrespective of the hierarchy of the discrimination level from the discrimination level 1 to the discrimination level 4, the wavelength band information and the wavelength resolution information are set in the respective discrimination levels in such a manner that the amounts of the spectrum data are equal to each other. Accordingly, the amounts of the spectrum data are equal to each other irrespective of the hierarchy of the discrimination level. Consequently, the time necessary for the discrimination processing is made uniform irrespective of the hierarchy of the discrimination level.

(9) The discrimination level is automatically updated recursively. Accordingly, in the case where the hierarchized discrimination level is moved from an upper class to a lower class, the discrimination of the measuring object can be further divided in more detail and can be made in more detail with the movement of the class. Consequently, the measuring object is spontaneously narrowed down so that the measuring object can be discriminated quickly.

(10) The restricting unit 32 restricts even the amount of the spectrum data regarding the observation light in a large amount which is detected by the spectrum sensor 14. Therefore, the amount of the data is reduced, resulting in reduction in the time necessary for computational processing to be performed by the comparing unit 33 in order to discriminate the measuring object. Consequently, it is possible to improve the feasibility of the real-time processing to be performed by the spectrum measuring apparatus.

(Second Embodiment)

Figure 10:
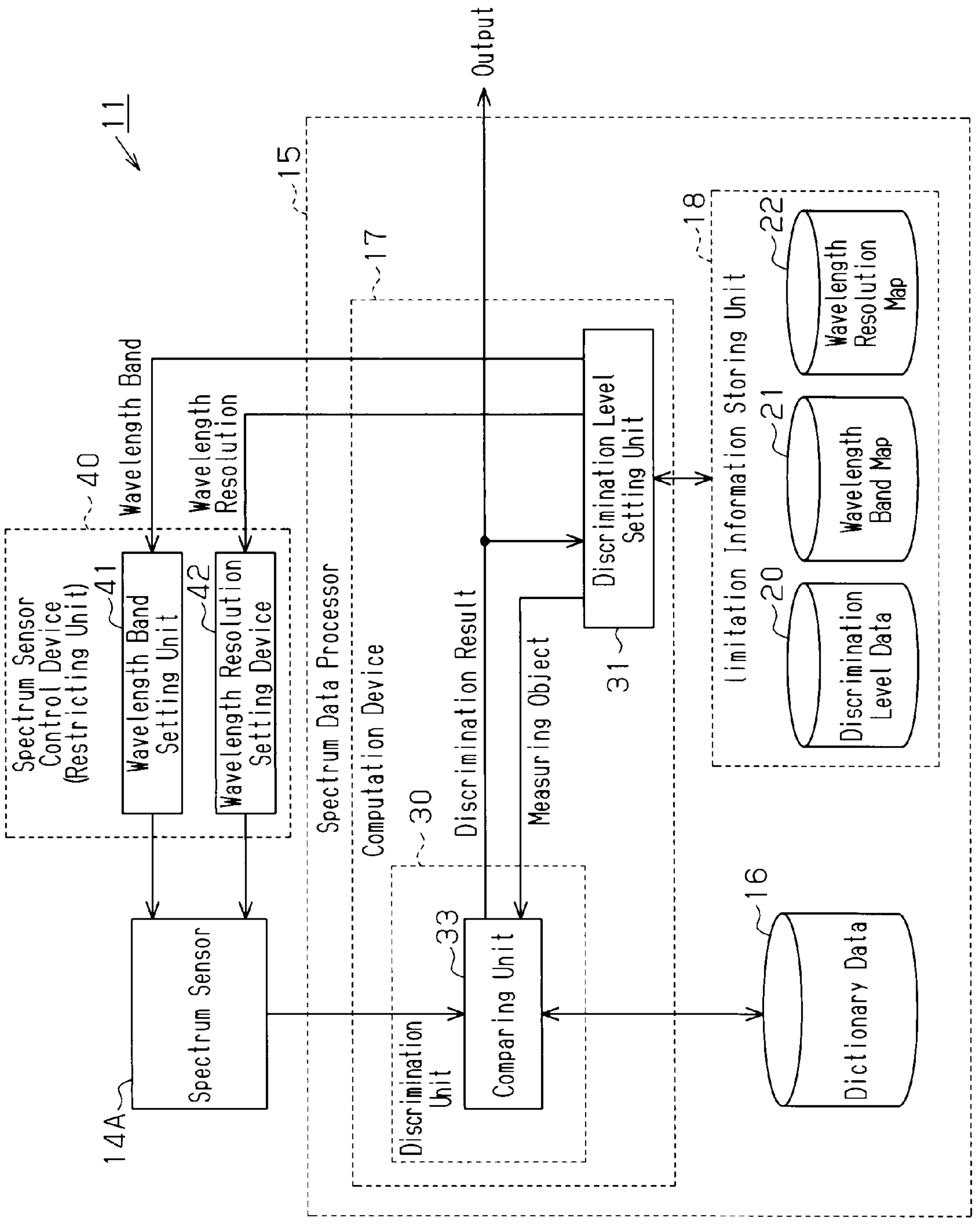
FIG. 10 is a block diagram showing a movable body according to a second embodiment equipped with a functional block for a movable body spectrum measuring apparatus of the present invention.

FIG. 10 shows schematic configuration according to a second embodiment of the movable body spectrum measuring apparatus in accordance with the present invention. This embodiment is different from the first embodiment in that the spectrum sensor 14 is replaced with a spectrum sensor 14A, a discrimination unit 30 has a different configuration, and a spectrum sensor control device 40 is added. The specific configuration of a spectrum measuring apparatus 11 will be described below centering on the differences between this embodiment and the first embodiment. The same members as those in the first embodiment are given the same reference numerals in FIG. 10 and overlapping description thereof is omitted.

FIG. 10 is a diagram showing the detailed block configuration of the spectrum measuring apparatus 11. As shown in FIG. 10, the spectrum sensor 14A outputs the detected observation light as the spectrum data consisting of wavelength information and light intensity information in the same manner as the spectrum sensor 14 in the first embodiment. In this embodiment, the spectrum sensor 14A can change the wavelength for detecting the light intensity information, and for example, only the light intensity information on the wavelength determined by the wavelength resolution and the wavelength band can be detected by setting a wavelength resolution and a wavelength band. Thus, the spectrum sensor 14A outputs the spectrum data regarding the observation light as the spectrum data regarding the restricted wavelength resolution and wavelength band.

A computation device 17 of a spectrum data processor 15 is provided with a discrimination unit 30 and a discrimination level setting unit 31, and the discrimination unit 30 is provided with a comparing unit 33. In other words, this embodiment is different from the first embodiment in that the discrimination unit 30 is not provided with the restricting unit 32. Consequently, spectrum data regarding an observation light which is output from the spectrum sensor 14A is directly input into the comparing unit 33. The comparing unit 33 compares the spectrum data regarding the observation light with dictionary data acquired from dictionary data storing unit 16.

In this embodiment, the spectrum measuring apparatus 11 is provided with a spectrum sensor control device 40. The spectrum sensor control device 40 is connected to the spectrum sensor 14A and can set a wavelength resolution, a wavelength band and the like which are detected from the observation light in the spectrum sensor 14A. The spectrum sensor control device 40 is provided with a wavelength band setting device 41 capable of setting a wavelength band in the spectrum sensor 14A and a wavelength resolution setting device 42 capable of setting a wavelength resolution in the spectrum sensor 14A. Consequently, the spectrum sensor control device 40 sets the wavelength band of the spectrum sensor 14A based on wavelength band information sent from the discrimination level setting unit 31, and sets the wavelength resolution of the spectrum sensor 14A based on wavelength resolution information sent from the discrimination level setting unit 31. Consequently, the spectrum sensor control device 40 functions as a restricting unit for changing the spectrum data regarding the observation light which is detected by the spectrum sensor 14A into restricted spectrum data.

Figure 11:
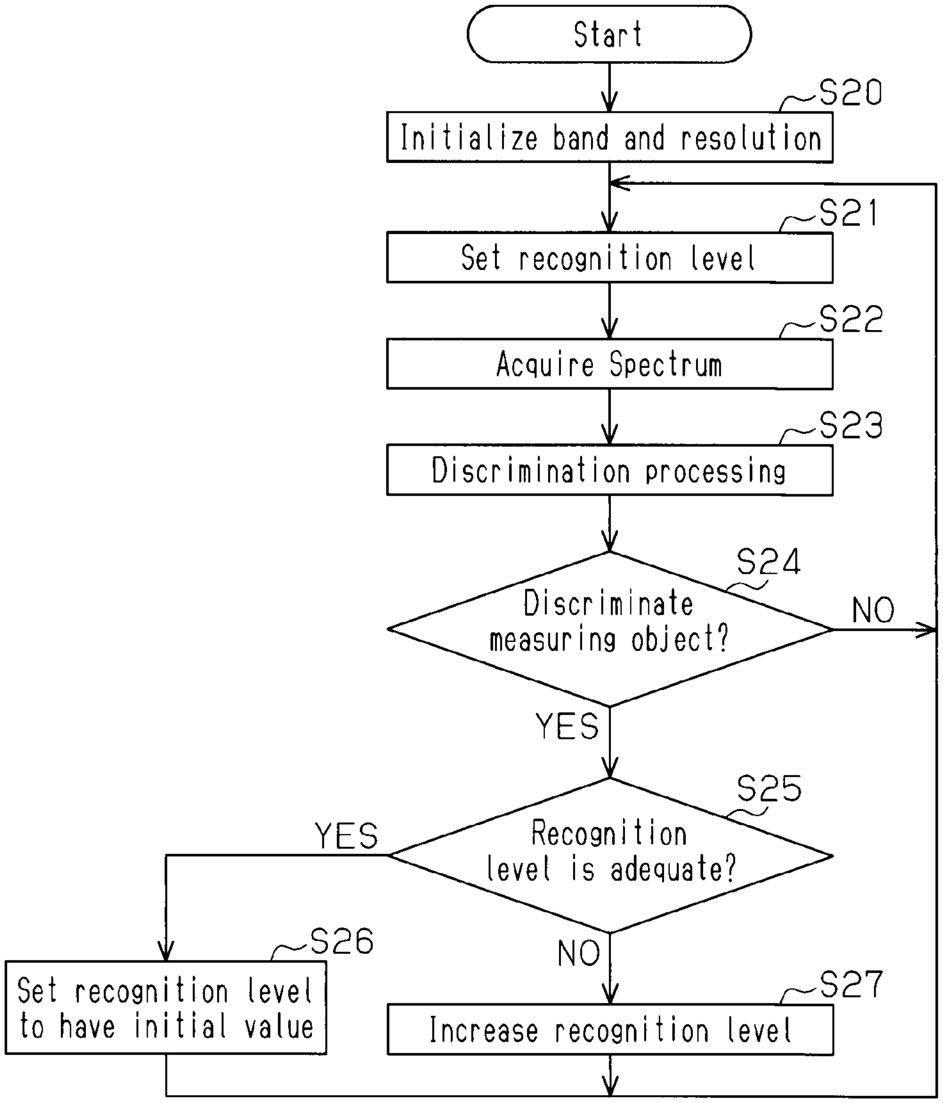
FIG. 11 is a flowchart showing discrimination processing in the second embodiment.

Next, the discrimination process of the measuring object in the spectrum measuring apparatus according to this embodiment will be described with reference to FIG. 11. FIG. 11 is a flowchart showing the discrimination process of the measuring object which is to be performed by the spectrum measuring apparatus.

The spectrum measuring apparatus 11 is brought into an operating state through power activation of a vehicle or the like and the spectrum data processor 15 performs the discrimination processing of the measuring object based on the spectrum data regarding the observation light which is detected by the spectrum sensor 14A. First, the spectrum data processor 15 initializes the wavelength band and the wavelength resolution which are detected by the spectrum sensor 14A through the spectrum sensor control device 40, and sets them to a maximum wavelength band and a maximum resolution in respect of specifications, for example (Step S20 in FIG. 11).

When the initialization is ended, the discrimination level setting unit 31 of the spectrum data processor 15 selects a recognition level for discriminating spectrum data regarding an observation light and a measuring object in the discrimination level, inputs a wavelength band and a wavelength resolution which correspond to the measuring object thus selected to the spectrum sensor control device 40, and then inputs the measuring object to the comparing unit 33. Consequently, the spectrum sensor control device 40 sets a wavelength region and a wavelength resolution which are detected by the spectrum sensor 14A based on wavelength band information and wavelength resolution information which are input. Thus, the spectrum data regarding the observation light which is detected by the spectrum sensor 14A is changed into restricted spectrum data based on the wavelength band information and the wavelength resolution information (Step S21 in FIG. 11).

The computation device 17 of the spectrum data processor 15 acquires the restricted spectrum data input as required (Step S22 in FIG. 11).

The comparing unit 33 of the spectrum data processor 15 acquires dictionary data corresponding to the input measuring object from the dictionary data storing unit 16 and compares the dictionary data with the restricted spectrum data, thereby determining agreement between both of the data (Step S24 in FIG. 11). When it is determined that both of the data thus compared do not agree (NO in the Step S24 of FIG. 11), the comparing unit 33 outputs information indicating that the measuring object has not been discriminated. Based on the information indicating that the discrimination was not established, the discrimination level setting unit 31 sets to select a next measuring object without changing the discrimination level. Thereafter, the discrimination processing returns to the Step S21.

On the other hand, when it is determined that both of the data compared with each other agree (YES in the Step S24 of FIG. 11), the comparing unit 33 outputs information indicating that the measuring object has been discriminated. Based on the information indicating that the discrimination has been established, the discrimination level setting unit 31 determines whether the discrimination level is adequate or not (Step S25 in FIG. 11). For example, if the discrimination of the measuring object is performed in the discrimination level 4, it is determined that the discrimination level is adequate. On the other hand, if the discrimination of the measuring object is performed in a discrimination level other than the discrimination level 4, it is determined that the discrimination level is inadequate.

When it is determined that the discrimination level is proper (YES in the Step S25 of FIG. 11), the discrimination level setting unit 31 of the spectrum data processor 15 returns the discrimination level into an initial value, for example, the discrimination level 1 (Step S26 in FIG. 11), the discrimination of the measuring object is performed from the highest discrimination level. In other words, the measuring object is discriminated in detail at a maximum. For this reason, the discrimination is not required any more so that the measuring object returns to an initial condition. Then, the discrimination processing returns to the Step S21.

On the other hand, when it is determined that the discrimination level is inadequate (NO in the Step S25 of FIG. 11), the discrimination level setting unit 31 of the spectrum data processor 15 changes the discrimination level into a lower discrimination level (Step S27 in FIG. 11) and selects a next measuring object. Then, the discrimination processing returns to the Step S21.

By the discrimination processing, the measuring object is discriminated in more detail, and furthermore, it is repeated to newly start to discriminate the measuring object roughly when the detailed discrimination is ended.

Consequently, a small amount of comparison computation is performed based on a small amount of the restricted spectrum data. Thus, the time necessary for the comparison computation is shortened. Because of the small amount of the computation, a storage capacity of a storing device such as a memory required for the computation is also reduced so that it is possible to obtain a simplification or flexibility of the configuration of the spectrum data processor 15, for example, the comparing unit 33 or the like.

Thus, even when a large amount of spectrum data regarding an observation light which is obtained by using the spectrum sensor is used, it is possible to prevent an increase in the time necessary for discrimination processing and to improve precision in a discrimination.

As described above, this embodiment can achieve advantages that are equal or equivalent to the advantages (1) to (9) in the first embodiment as well as the following advantages.

(11) The wavelength band information and the wavelength resolution information are set to restrict the spectrum data regarding the observation light which is detected by the spectrum sensor 14A. Accordingly, the amount of the data is reduced and the time necessary for a computational discrimination process of a measuring object is reduced, thereby increasing the feasibility of a real-time processing to be performed by the spectrum measuring apparatus.

(Third Embodiment)

Figure 12:
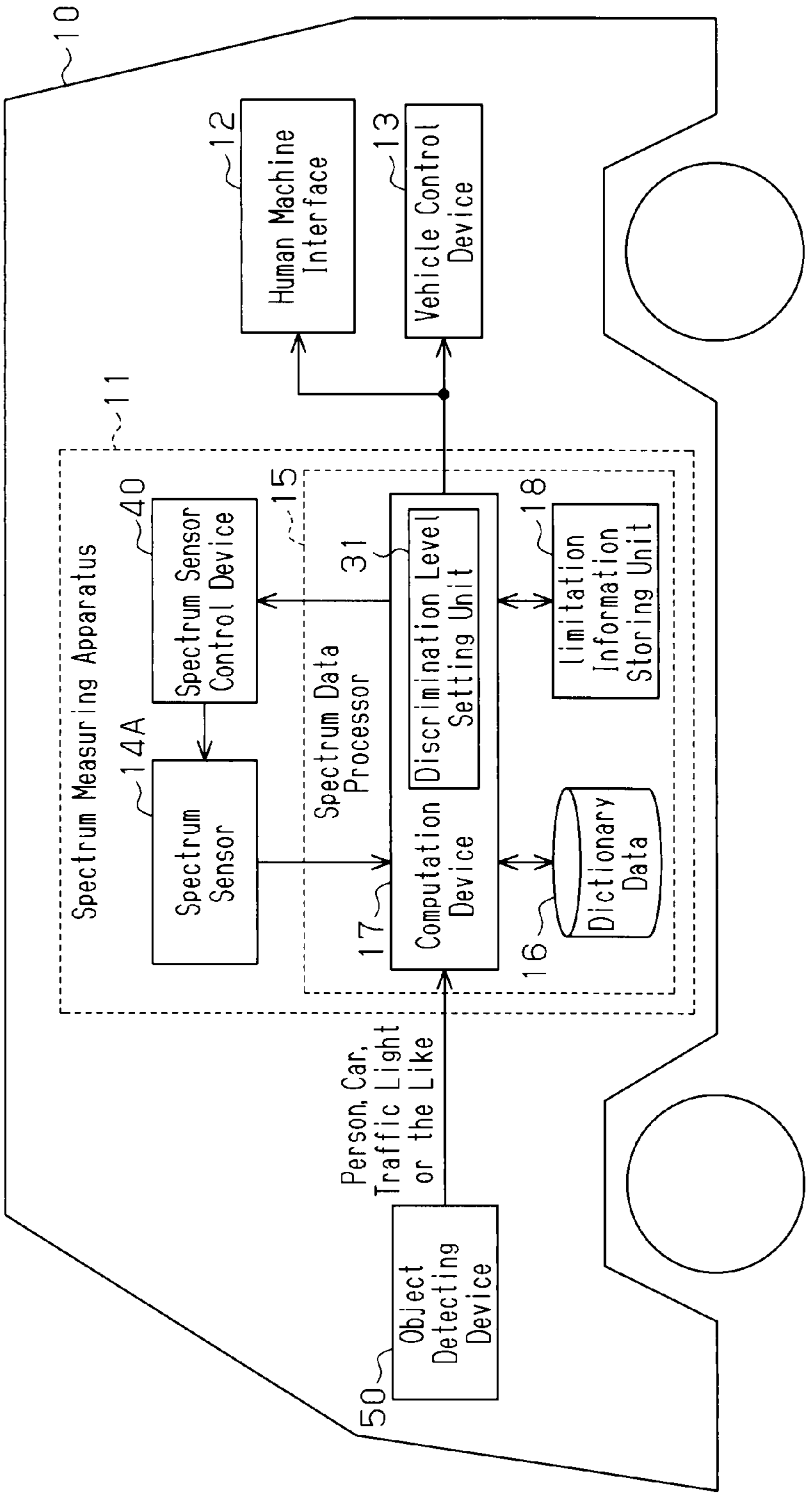
FIG. 12 is a block diagram showing a movable body according to a third embodiment provided with a movable body spectrum measuring apparatus of the present invention.

FIG. 12 shows the schematic configuration of a third embodiment of the movable body spectrum measuring apparatus according to the present invention. This embodiment is different from the second embodiment in that an object detecting device 50 is added. The specific configuration of a spectrum measuring apparatus 11 will be described below centering on the differences between this embodiment and the first and second embodiments. The same members as those in the first and second embodiments are given the same reference numerals in FIG. 12, and overlapping description thereof is omitted.

FIG. 12 is a diagram showing the block configuration of functions provided in a vehicle as a movable body including the movable body spectrum measuring apparatus. As shown in FIG. 12, a vehicle 10 is provided with the separate object detecting device 50 in addition to the spectrum measuring apparatus 11, a human machine interface 12, and a vehicle control device 13.

The object detecting device 50 is a publicly-known image processing system or any detecting device for detecting a specified object, and transmits information of the detected object to a connected computation device 17. In this embodiment, the object detecting device 50 is a device for detecting a person, a car, a traffic light or the like as an object having a high occurrence ratio in a road environment where the vehicle is moving. That is, the object detecting device 50 informs appearance of the object such as the person, the car, the traffic light or the like to the computation device 17. Examples of the object detecting device 50 may include various sensors for detecting persons and animals and various sensors for detecting near cars.

A discrimination level setting unit 31 of the computation device 17 processes information given from the object detecting device 50. The discrimination level setting unit 31 gives a high priority for an object given from the object detecting device 50 and reflects the priority in selection of a measuring object which is to be subsequently performed. Consequently, the object detected by the object detecting device 50 is rapidly discriminated in detail.

Thus, in the case where the discrimination processing is performed by using the spectrum sensor, precision in the discrimination is maintained to be high and a part of the processing is omitted. Consequently, it is possible to shorten the time necessary for the discrimination processing.

As described above, this embodiment also can achieve advantages that are equal or equivalent to the advantages (1) to (11) in the first and second embodiments as well as the following advantages.

(12) The discrimination processing is preferentially performed for the measuring object detected by the object detecting device 50. Accordingly, it is possible to discriminate the measuring object quickly and to omit the processing for recognizing a measuring object having a low occurrence ratio, resulting in reduction in the time necessary for the discrimination processing.

(Fourth Embodiment)

Figure 13:
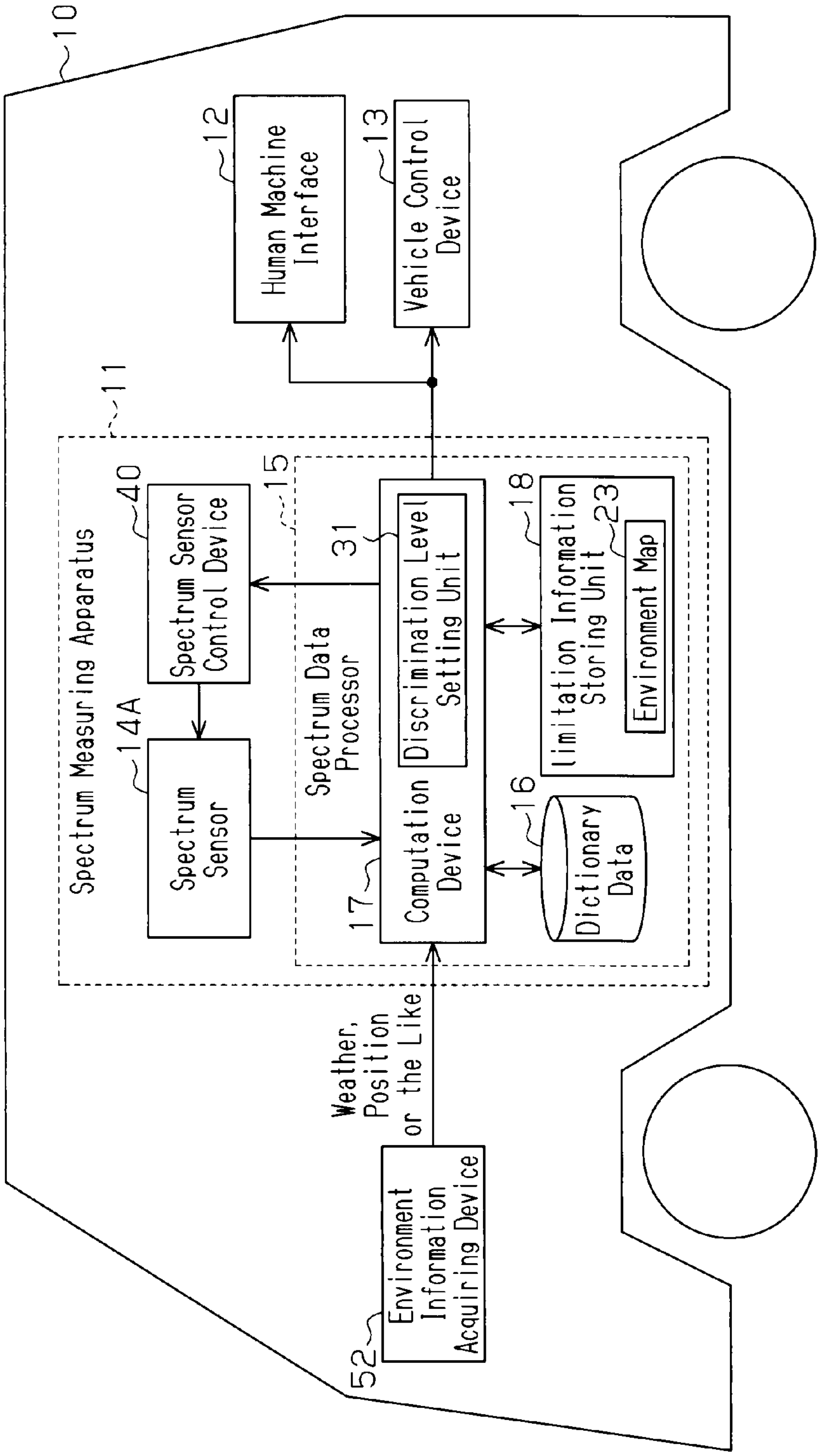
FIG. 13 is a block diagram showing a movable body according to a fourth embodiment provided with a movable body spectrum measuring apparatus of the present invention.

FIG. 13 shows schematic configuration according to a fourth embodiment of the movable body spectrum measuring apparatus in accordance with the present invention. This embodiment is different from the preceding second embodiment in that an environment information acquiring device 52 is added. The specific configuration of the spectrum measuring apparatus 11 will be described below centering on the difference between this embodiment and the first and second embodiments. The same members as those in the first and second embodiments are given the same reference numerals in FIG. 13, and overlapping description thereof is omitted.

FIG. 13 is a diagram showing the block configuration of functions provided in a vehicle as a movable body including the movable body spectrum measuring apparatus. As shown in FIG. 13, a vehicle 10 is provided with the environment information acquiring device 52 in addition to the spectrum measuring apparatus 11, a human machine interface 12 and a vehicle control device 13.

The environment information acquiring device 52 is an environment acquiring device for acquiring information on external environment of the vehicle 10, such as weather and position, and transmits the detected environment information to a connected computation device 17. In this embodiment, a navigation system that detects position information of the vehicle 10 and represents the position on a map of a display panel, thereby transmitting the information to an occupant is adopted as the environment information acquiring device 52. Other examples of the environment information acquiring device 52 may include a device for detecting a wiper operation when acquiring weather, a device for acquiring a value of a thermometer, a hygrometer or a barometer, and a device for acquiring the values through communication with a radio and a weather informing system. Other examples of the environment information acquiring device 52 may include a navigation system for specifying position based on position information from GPS (Global Positioning System), combination of the position information and a map or the like when acquiring the position, and a device for acquiring position information through communication with a system for informing position information.

Figure 14:
FIG. 14 is an explanatory view showing an example of map information for acquiring position information in the fourth embodiment.

FIG. 14 shows an example indicative of position information on the vehicle 10 which is obtained by the environment information acquiring device 52. As shown in FIG. 14, when the vehicle 10 is present on a first point P1, for example, the presence of "agricultural field" in a surrounding part of a road is transmitted to the computation device 17 because the surrounding part is "agricultural field". For example, a discrimination level setting unit 31 of the computation device 17 processes the information. For example, the discrimination level setting unit 31 selects, from an environment map 23, "road" to be an object having a high recognition request in "agricultural field" sent from the environment information acquiring device 52 and gives a high priority for the selected object, thereby reflecting the priority in selection of a measuring object which is to be subsequently performed. For example, when the vehicle 10 is present on a second point P2, the discrimination level setting unit 31 which is informed of the fact that the surrounding part is "motor highway" selects, from the environment map 23, "car" to be an object having a high recognition request in "motor highway" and gives a high priority for the object selected at this time and reflects the priority in selection of a measuring object which is to be subsequently performed. In addition, when the vehicle 10 is present on a fourth point P4, for example, the discrimination level setting unit 31 which is informed of the fact that a large number of facilities are present in a surrounding part selects, from the environment map 23, "person" to be an object having a high recognition request in "facilities" and gives a high priority for the object selected at this time and reflects the priority in selection of a measuring object which is to be subsequently performed. For example, when the vehicle 10 is present on a third point P3, the discrimination level setting unit 31 which is informed of the fact that "intersection" is present in a surrounding part selects, from the environment map 23, "traffic light" to be an object having a high recognition request in "intersection" and gives a high priority for the object selected at this time and reflects the priority in selection of a measuring object which is to be subsequently performed.

Figure 15A:
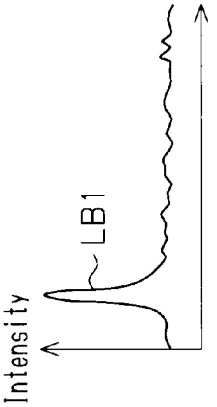
FIG. 15 are graphs showing a spectrum waveform as dictionary data regarding an LED type traffic light in the fourth embodiment, where FIG. 15(*a*) shows spectrum data on a green lamp, FIG. 15(*b*) shows spectrum data on an yellow lamp and FIG. 15(*c*) shows spectrum data on a red lamp.
Figure 15B:
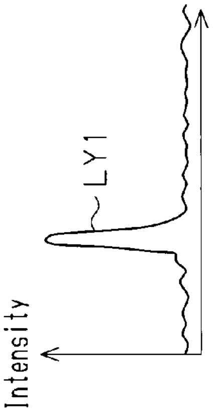
Figure 15C:
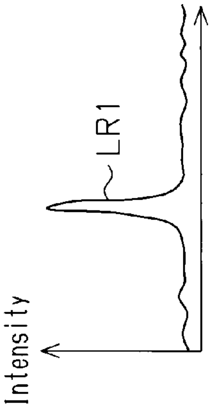
Figure 16A:
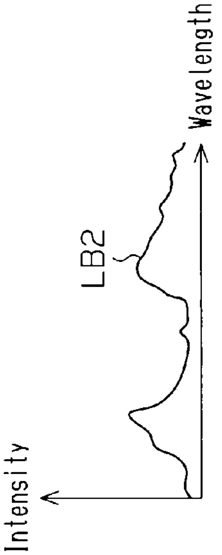
FIG. 16 are graphs showing a spectrum waveform as dictionary data regarding an incandescent light bulb type traffic light in the fourth embodiment, where FIG. 16(*a*) shows spectrum data regarding a green lamp, FIG. 16(*b*) shows spectrum data regarding an yellow lamp and FIG. 16(*c*) shows spectrum data regarding a red lamp.
Figure 16B:
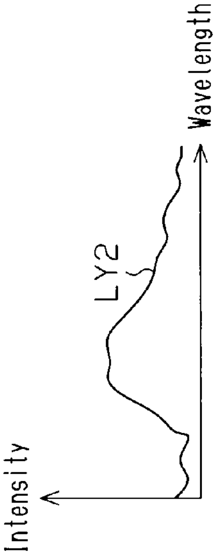
Figure 16C:
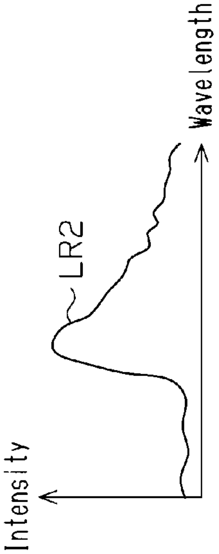
Figure 17:
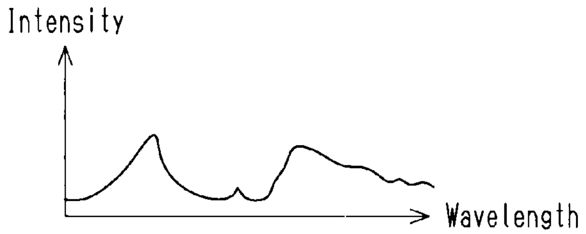
FIG. 17 is a graph showing an example of spectrum data regarding an observation light in the case where a traffic light output from a spectrum sensor is set to be a measuring object in the fourth embodiment.
Figure 18:
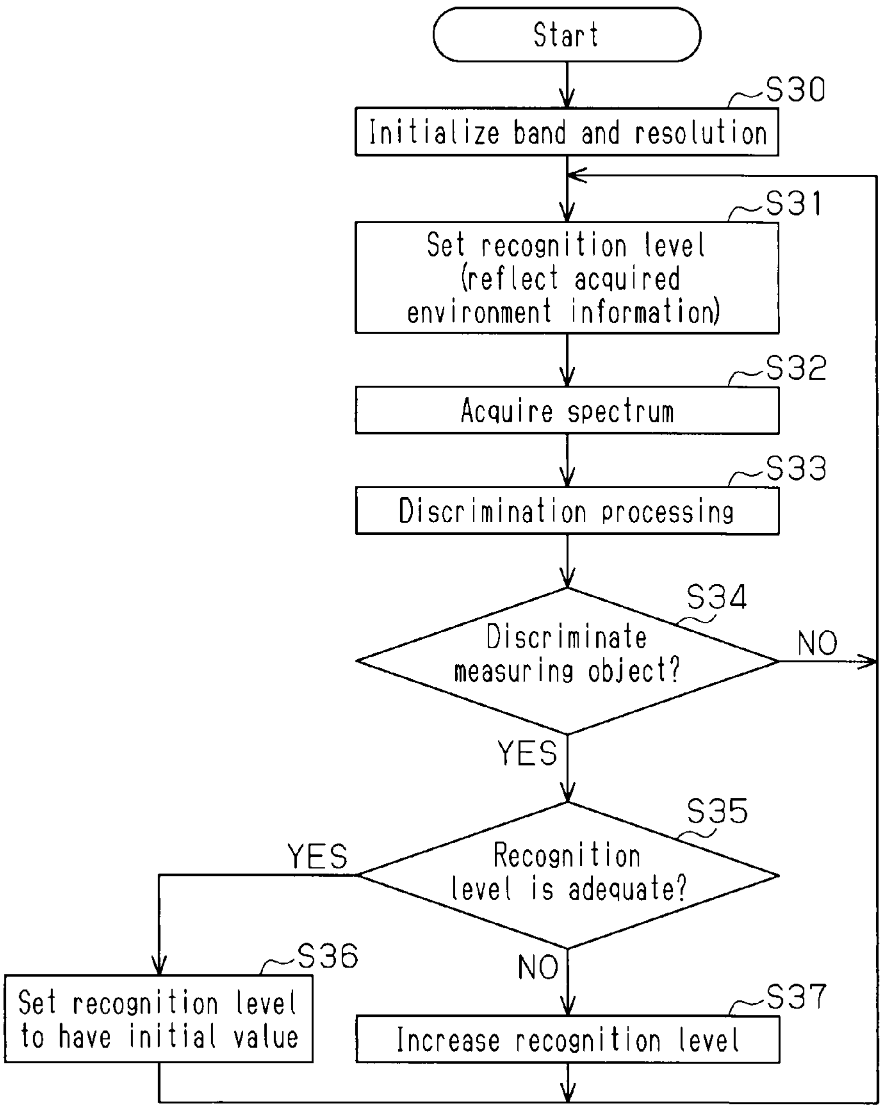
FIG. 18 is a flowchart showing discrimination processing in the fourth embodiment.

By taking the traffic light as an example, next, the discrimination processing according to this embodiment will be described with reference to FIGS. 15 to 18. FIG. 15 are graphs showing an example of spectrum data on each signal lamp of an LED type traffic light, and FIG. 15(*a*) shows a green lamp, FIG. 15(*b*) shows an yellow lamp and FIG. 15(*c*) shows a red lamp. FIG. 16 are graphs showing an example of spectrum data regarding each signal lamp of an incandescent light bulb type traffic light, and FIG. 16(*a*) shows a green lamp, FIG. 16(*b*) shows an yellow lamp and FIG. 16(*c*) shows a red lamp. FIG. 17 shows an example of spectrum data regarding an observation light, and FIG. 18 is a flowchart showing a discrimination process of a measuring object according to this embodiment.

A dictionary data storing unit 16 retains each spectrum data on the green, yellow and red lamps shown in FIG. 15 as LED type dictionary data for each of the LED type and the incandescent light bulb type as the traffic lights, and retains each spectrum data on the green, yellow and red lamps shown in FIG. 16 as dictionary data regarding the incandescent light bulb type. For example, it is assumed that spectrum data regarding an observation light as the light of the green lamp of the incandescent light bulb type shown in FIG. 17 is acquired at the intersection.

Next, the discrimination process of a measuring object in the spectrum measuring apparatus according to this embodiment will be described with reference to FIG. 18. FIG. 18 is a flowchart showing the discrimination process of a measuring object reflecting environment information which is to be performed by the spectrum measuring apparatus.

A spectrum data processor 15 of the spectrum measuring apparatus 11 performs the discrimination processing of the measuring object based on the spectrum data regarding the observation light. First, the spectrum data processor 15 initializes a wavelength band and a wavelength resolution which are detected by a spectrum sensor 14A through a spectrum sensor control device 40 (Step S30 in FIG. 18).

When the initialization is ended, the discrimination level setting unit 31 of the spectrum data processor 15 selects a recognition level for discriminating spectrum data regarding an observation light and a measuring object in the discrimination level. In this case, in this embodiment, it is assumed that a measuring object having a high discrimination request in an environment is selected by the environment map 23 or the like based on environment information acquired by the environment information acquiring device 52, thereby detecting the measuring object at a high probability. In the case where another measuring object having a higher priority than the measuring object acquired based on the environment is not discriminated by an ordinary method, it is assumed that the measuring object acquired based on the environment is discriminated. Herein, it is assumed that "traffic light" having a high recognition request in "intersection" is discriminated from the environment map 23 based on information indicating that the environment is "intersection". Consequently, the discrimination level setting unit 31 selects a signal lamp as the measuring object in order to discriminate "traffic light" in more detail. For example, the discrimination processing is performed in the order of an incandescent light bulb type red lamp, an LED type red lamp, an incandescent light bulb type yellow lamp, an LED type yellow lamp, an incandescent light bulb type green lamp and an LED type green lamp until the signal lamp is discriminated. In other words, the incandescent light bulb type red lamp is selected as the signal lamp of the measuring object at first. More specifically, the discrimination level setting unit 31 inputs, to the spectrum sensor control device 40, a wavelength band and a wavelength resolution which correspond to the incandescent light bulb type red lamp and inputs the incandescent light bulb type red lamp as the measuring object to a comparing unit 33. Consequently, the spectrum data regarding the observation light which is detected by the spectrum sensor 14A is spectrum data restricted based on the wavelength band and the wavelength resolution which correspond to the incandescent light bulb type red lamp (Step S31 in FIG. 18).

The computation device 17 of the spectrum data processor 15 acquires the restricted spectrum data to be input as required (Step S32 in FIG. 18). At this time, spectrum data regarding an observation light of the incandescent light bulb type green lamp shown in FIG. 17 is input into the computation device 17.

The comparing unit 33 of the spectrum data processor 15 acquires the input measuring object, dictionary data corresponding to the incandescent light bulb type red lamp at first in this example from the dictionary data storing unit 16 and compares the dictionary data with the restricted spectrum data, thereby determining agreement between both of the data (Step S33 in FIG. 18). When it is determined that both of the data thus compared with each other do not agree (No in Step S34 of FIG. 34), the comparing unit 33 outputs information indicating that the measuring object has not been discriminated. Based on the information indicating that the measuring object has not been discriminated, the discrimination level setting unit 31 sets to select a next measuring object without changing the discrimination level. Then, the discrimination processing returns to the Step S31. In other words, when the spectrum data regarding the observation light of the incandescent light bulb type green lamp is compared with the dictionary data corresponding to the incandescent light bulb type red lamp, information indicating that the measuring object has not been discriminated is output so that the discrimination level setting unit 31 is set to select a next measuring object without changing the discrimination level. In other words, the LED type red lamp is selected as the next measuring object.

On the other hand, when it is determined that both of the data compared with each other agree (YES in the Step S34 of FIG. 18), the comparing unit 33 outputs information indicating that the measuring object has been discriminated. More specifically, in the case where the spectrum data regarding the observation light of the incandescent light bulb type green lamp is then compared with the dictionary data corresponding to the incandescent light bulb type green lamp, information indicating that the measuring object has been discriminated is output. Based on the information indicating that the measuring object has been discriminated, the discrimination level setting unit 31 determines whether the discrimination level is adequate or not (Step S35 in FIG. 18). In other words, the incandescent light bulb type green lamp does not need to be discriminated in more detail. Therefore, it is determined that the discrimination level is adequate.

When it is determined that the discrimination level is adequate (YES in the Step S35 of FIG. 18), the discrimination level setting unit 31 of the spectrum data processor 15 returns the discrimination level into an initial value (Step S36 in FIG. 18). Then, the discrimination processing returns to the Step S31.

On the other hand, when it is determined that the discrimination level is inadequate (NO in the Step S35 of FIG. 18), the discrimination level setting unit 31 of the spectrum data processor 15 changes the discrimination level into a lower discrimination level (Step S37 in FIG. 18). Then, the discrimination processing returns to the Step S31. In other words, the measuring object is discriminated in more detail based on environment information through the discrimination processing.

Consequently, in the case where the discrimination processing is performed by using the spectrum sensor, precision in the discrimination is maintained to be high and a part of the processing is omitted, thereby reducing the time necessary for the discrimination processing.

As described above, this embodiment can achieve advantages that are equal or equivalent to the advantages (1) to (11) in the first and second embodiments as well as the following advantages.

(13) By preferentially performing the discrimination processing of the measuring object having a high occurrence ratio or the measuring object having a high priority on the basis of the environment information acquired by the environment information acquiring device 52, the measuring object can be discriminated quickly. Consequently, the recognition processing of the measuring object having a low occurrence ratio is omitted, thereby reducing the time necessary for the discrimination processing.

(14) When the acquired environment information is weather information, by increasing the priority of an umbrella, a puddle or the wet measuring object that has a high occurrence ratio in the case of rainy weather and has a low priority in the case of sunny weather, the measuring object can be discriminated quickly.

(15) When the environment information is position information of the movable body, by setting the measuring object having a high priority for a car or a white line on a road in the case of motor highways, a road in the case of agricultural fields, a person or a traffic light in the case of urban areas and a person, especially, child or older person in the case of residential streets, the measuring object can be discriminated quickly.

(Fifth Embodiment)

Figure 19:
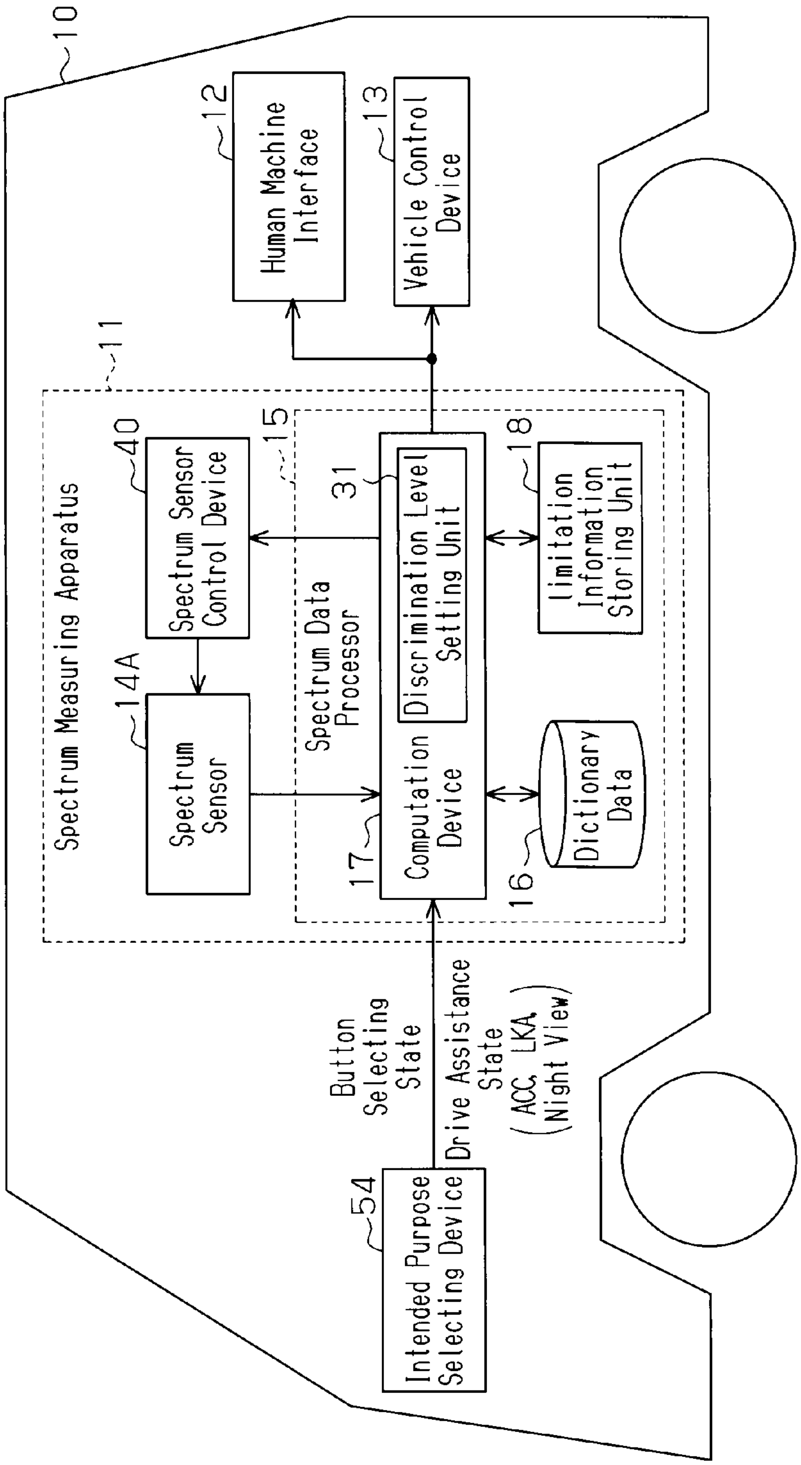
FIG. 19 is a block diagram showing a movable body according to a fifth embodiment provided with a movable body spectrum measuring apparatus of the present invention.

FIG. 19 shows the schematic configuration of a fifth embodiment of the movable body spectrum measuring apparatus according to the present invention. This embodiment is different from the second embodiment in that an intended purpose selecting device 54 is added. The specific configuration of a spectrum measuring apparatus 11 will be described below centering on the difference between this embodiment and the first and second embodiments. The same members as those in First and Second embodiments are given the same reference numerals in FIG. 19, overlapping description thereof is omitted.

FIG. 19 is a block diagram showing features of the vehicle as the movable body provided with the movable body spectrum measuring apparatus. As shown in FIG. 19, a vehicle 10 is provided with the intended purpose selecting device 54 in addition to the spectrum measuring apparatus 11, a human machine interface 12 and a vehicle control device 13.

Figure 20:
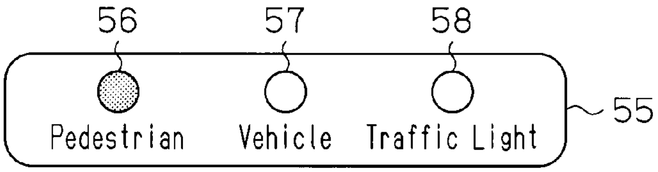
FIG. 20 is a schematic view showing a selecting button as an example of a using state measuring apparatus in the fifth embodiment.

The intended purpose selecting device 54 is a device for narrowing down the possibilities for a measuring object according to a system operating state of the vehicle 10 or the operator's selection, and transmits the narrowed down measuring object to a connected computation device 17. In this embodiment, a discrimination object selecting button 55 provided in the vehicle 10 as shown in FIG. 20 is adopted as the intended purpose selecting device 54. In addition, when drive assistance is performed by adaptive cruise control (ACC) to control a distance from the vehicle ahead, the intended purpose selecting device 54 may select a car as the measuring object. When drive assistance is performed by lane keeping assistance control (LKA) to control a lane for the vehicle, a white line on a road surface may be selected as the measuring object. When drive assistance is performed by on-vehicle night vision device (night view), a pedestrian may be selected as the measuring object. The measuring object is discriminated in cooperation with a drive assistance system in this manner to meet the purpose of the assistance, which increases the adoptability of the movable body spectrum measuring apparatus.

As shown in an example of FIG. 20, the discrimination object selecting button 55 is provided with a pedestrian selecting button 56 for selecting a pedestrian as a selected object, a vehicle selecting button 57 for selecting a vehicle and a signal selecting button 58 for selecting a signal. When the pedestrian selecting button 56 of the discrimination object selecting button 55 is selected, information that a measuring object is "pedestrian" is transmitted to the computation device 17. A discrimination level setting unit 31 of the computation device 17 processes the information and selects the measuring object to perform a detailed discrimination based on "pedestrian" or a lower discrimination level under "pedestrian". In other words, the discrimination object selecting button 55 is a selecting switch group to be manually operated by a driver of the vehicle 10.

Figure 21:
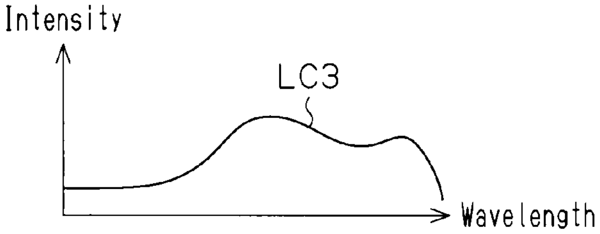
FIG. 21 are graphs showing a spectrum waveform as dictionary data regarding an LED type traffic light in the fifth embodiment, where FIG. 21(*a*) shows spectrum data regarding a vehicle, FIG. 21(*b*) shows spectrum data regarding a person and FIG. 21(*c*) shows spectrum data regarding a white line on a road surface.
Figure 21:
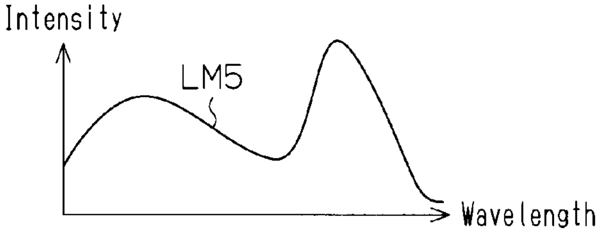
Figure 21:
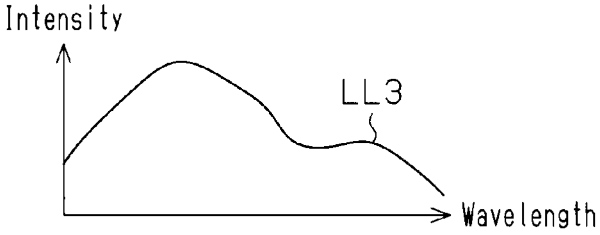
Figure 22:
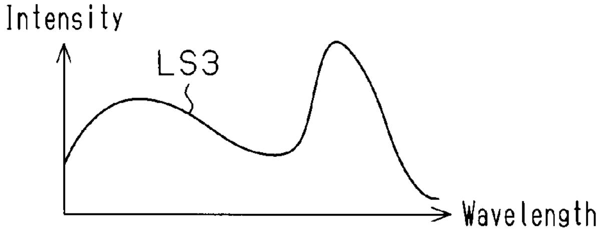
FIG. 22 is a graph showing an example of spectrum data regarding an observation light in the case where a pedestrian output from a spectrum sensor is a measuring object in the fifth embodiment.
Figure 23:
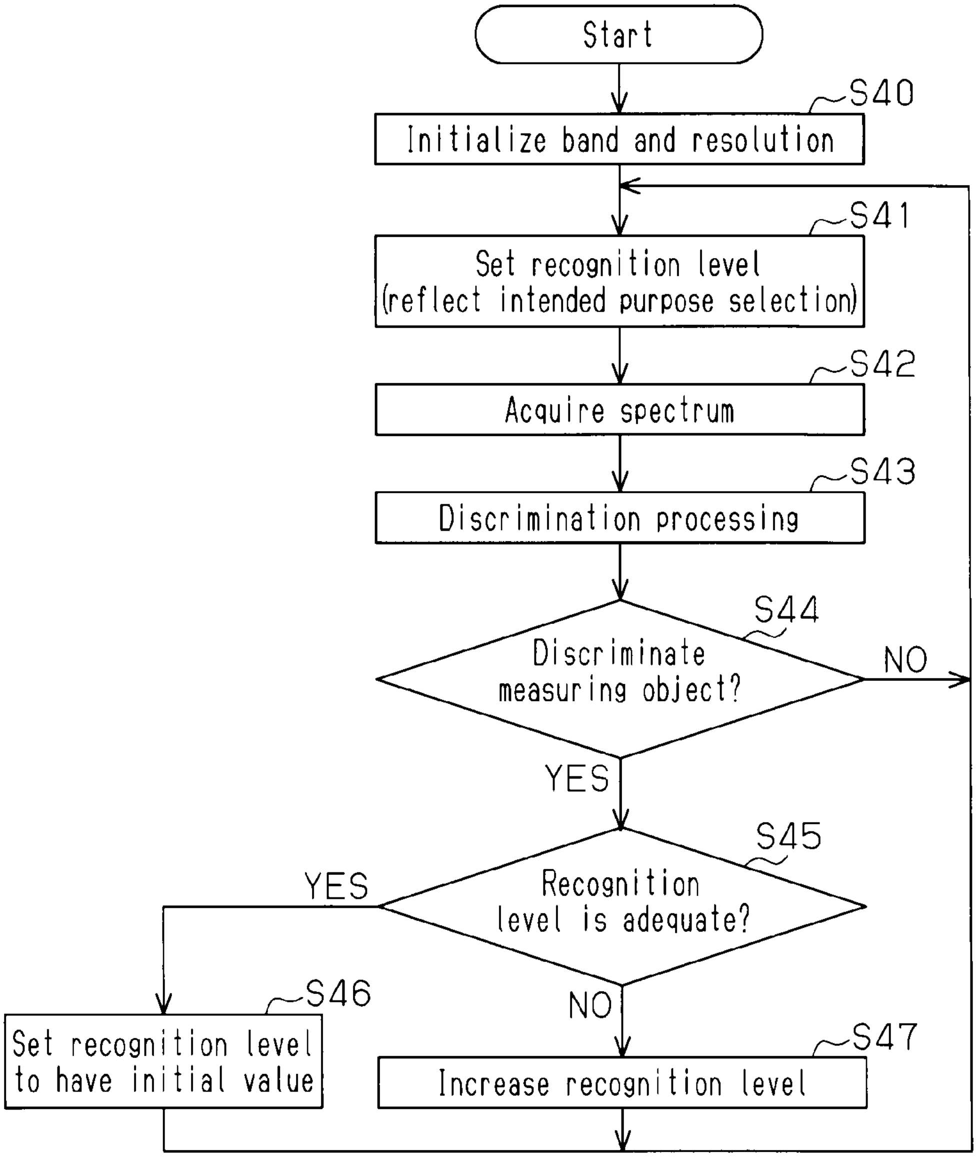
FIG. 23 is a flowchart showing discrimination processing in the fifth embodiment.

Next, a discrimination processing according to this embodiment will be described with reference to FIGS. 21 to 23 by taking "pedestrian" as an example. FIG. 21 are graphs showing an example of spectrum data regarding a part of the measuring objects selected by the intended purpose selecting device 54, and FIG. 21(*a*) shows a vehicle, FIG. 21(*b*) shows a person as the pedestrian and FIG. 21(*c*) shows a white line on a road surface. FIG. 22 shows an example of spectrum data regarding an observation light and FIG. 23 is a flowchart showing discrimination processing of a measuring object according to this embodiment.

A dictionary data storing unit 16 retains spectrum data LC3, LM5 and LL3 of a vehicle, a person and a white line on the road surface shown in FIG. 21 as dictionary data regarding a part of the measuring objects selected by the intended purpose selecting device 54. A spectrum sensor 14A detects spectrum data LS3 of an observation light shown in FIG. 22.

Next, the discrimination process of the measuring object in the spectrum measuring apparatus according to this embodiment will be described with reference to FIG. 23. FIG. 23 is a flowchart showing the discrimination processing of the measuring object reflecting an intended purpose selection which is to be performed by the spectrum measuring apparatus.

A spectrum data processor 15 of the spectrum measuring apparatus 11 performs the discrimination processing of the measuring object based on the spectrum data regarding the observation light. First, the spectrum data processor 15 initializes a wavelength band and a wavelength resolution which are detected by the spectrum sensor 14A through a spectrum sensor control device 40 (Step S40 in FIG. 23).

When the initialization is ended, a discrimination level setting unit 31 of the spectrum data processor 15 selects a recognition level for discriminating the spectrum data regarding the observation light and a measuring object in the discrimination level. In this case, it is assumed that a measuring object to be designated in the selection is detected at a high probability based on an intended purpose selection acquired by the intended purpose selecting device 54. It is assumed that the designated measuring object is discriminated when the other measuring object having a higher priority than the designated measuring object is not discriminated by an ordinary method. Herein, a measuring object designated based on the pedestrian selecting button 56 selected by the discrimination object selecting button 55 is "pedestrian". Therefore, it is assumed that "person" is discriminated. Consequently, the discrimination level setting unit 31 selects "person" as the measuring object in order to discriminate "pedestrian". Then, a wavelength band and a wavelength resolution which correspond to "person" are input into the spectrum sensor control device 40 and "person" is input as the measuring object to a comparing unit 33. Consequently, the spectrum data regarding the observation light which is detected by the spectrum sensor 14A is spectrum data restricted based on the wavelength band and the wavelength resolution which correspond to "person" (Step S41 in FIG. 23).

The computation device 17 of the spectrum data processor 15 acquires the restricted spectrum data input as required (Step S42 in FIG. 23). At this time, the spectrum data LS3 of the observation light of "person" as shown in FIG. 22 is input into the computation device 17.

The comparing unit 33 of the spectrum data processor 15 first acquires the input measuring object, in this example, the dictionary data corresponding to "person" from the dictionary data storing unit 16 and compares the dictionary data with the restricted spectrum data, thereby determining agreement between both of the data (Step S44 in FIG. 23). When it is determined that both of the data compared with each other do not agree (NO in the Step S44 of FIG. 23), the comparing unit 33 outputs information indicating that the measuring object has not been discriminated. Based on the information indicating that the discrimination has not been established, the discrimination level setting unit 31 sets to select a next measuring object without changing the discrimination level. Thereafter, the discrimination processing returns to the Step S21.

On the other hand, when it is determined that both of the data compared with each other agree (YES in the Step S44 of FIG. 23), the comparing unit 33 outputs information indicating that the measuring object has been discriminated. In other words, if the spectrum data regarding the observation light of "person" is compared with the dictionary data corresponding to "person", information indicating that the measuring object has been discriminated is output. Based on the information indicating that the discrimination is performed, the discrimination level setting unit 31 determines whether the discrimination level is adequate or not (Step S45 in FIG. 23).

When it is determined that the discrimination level is adequate (YES in the Step S45 of FIG. 23), the discrimination level setting unit 31 of the spectrum data processor 15 returns the discrimination level into an initial value (Step S46 in FIG. 23). Then, the discrimination processing returns to the Step S41.

On the other hand, when it is determined that the discrimination level is inadequate (NO in the Step S45 of FIG. 23), the discrimination level setting unit 31 of the spectrum data processor 15 changes the discrimination level into a lower discrimination level (Step S47 in FIG. 23). Then, the discrimination processing returns to the Step S31. In other words, "person" as the measuring object is discriminated so that the discrimination level setting unit 31 is set to change the discrimination level and to select a next measuring object. More specifically, a measuring object obtained by classifying "person" in detail is selected at a next time. By the discrimination processing, the measuring object is discriminated in more detail based on environment information.

Thus, in the case where the discrimination processing is performed by using the spectrum sensor, precision in the discrimination is maintained to be high and a part of the processing is omitted, thereby reducing the time necessary for the discrimination processing.

As described above, this embodiment can achieve advantages that are equal or equivalent to the advantages (1) to (11) in the first and second embodiments as well as the following advantages.

(16) The measuring measures set by the intended purpose selecting device 54 can be preferentially subjected to the discrimination processing. By preferentially performing the discrimination processing of the measuring object that requires assistance of the spectrum measuring apparatus in the movable body, consequently, the measuring object can be discriminated quickly. Further, the recognition processing of the measuring object having a low occurrence ratio is omitted and the time necessary for the discrimination processing is also reduced.

(17) By the discrimination object selecting button 55, assistance can be achieved through the spectrum measuring apparatus 11 for a measuring object selected by a driver. Consequently, by preferentially performing the discrimination processing over a measuring object having a high priority for the driver, it is also possible to discriminate the measuring object quickly.

(18) A measuring object having a high priority, which is determined according to the intended purpose of the drive assistance system, is preferentially subjected to the discrimination processing. As a result, the measuring object can be discriminated quickly. In addition, the recognition processing of the measuring object having a low occurrence ratio is omitted, thereby reducing the time necessary for the discrimination processing. For example, when drive assistance is performed by adaptive cruise control (ACC) to control a distance from the vehicle ahead, a car is selected as the measuring object having a high priority. When drive assistance is performed by lane keeping assistance control (LKA) to control a lane for the vehicle, a white line on a road surface is selected as the measuring object having a high priority. When drive assistance is performed by an on-vehicle night vision device (night view), a pedestrian is selected as the measuring object having a high priority. The measuring object is discriminated in cooperation with a drive assistance system by the setting to meet the purpose of the assistance, which increases the adoptability of the movable body spectrum measuring apparatus.

(Sixth Embodiment)

Figure 24:
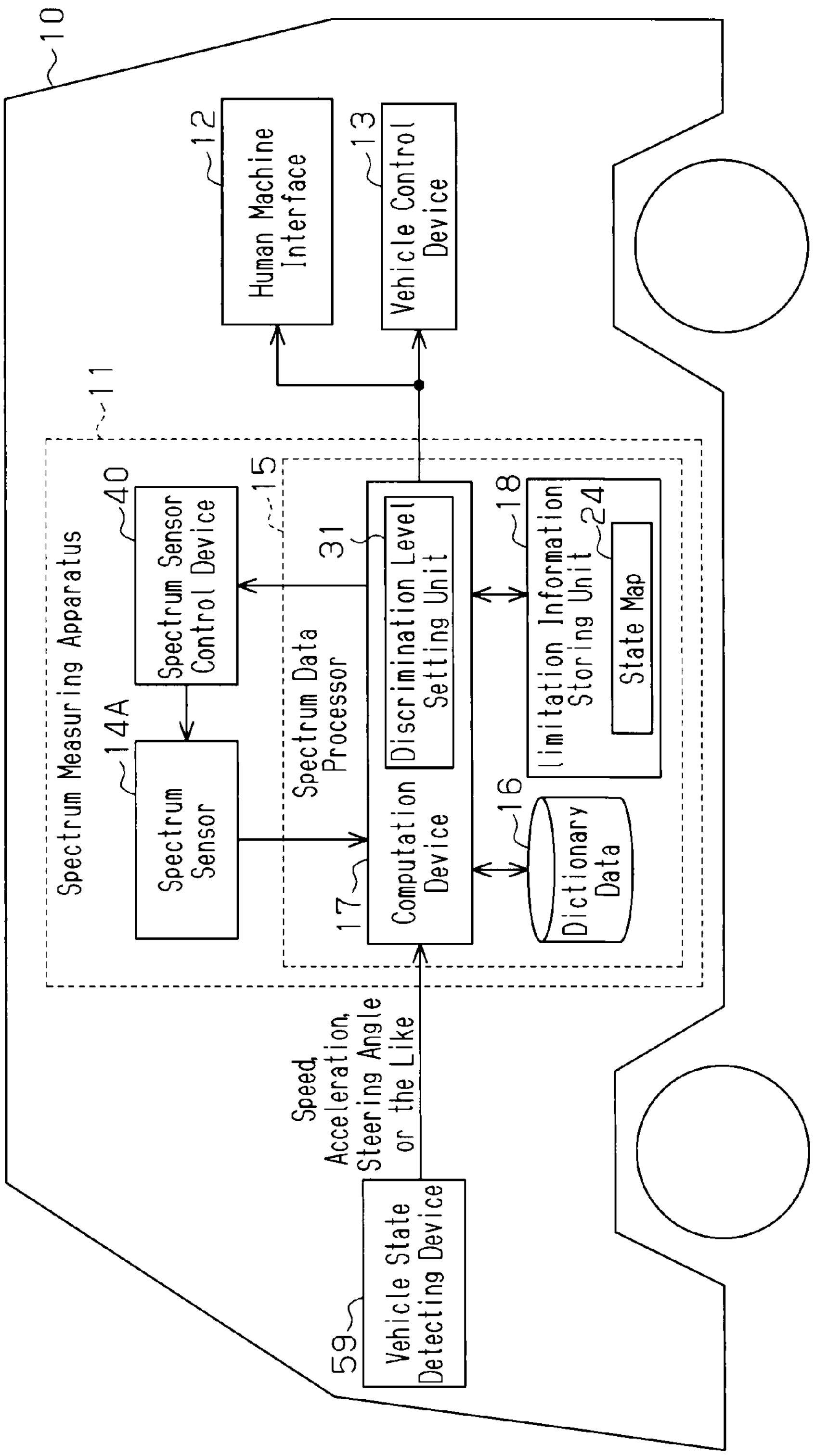
FIG. 24 is a block diagram showing a movable body according to a sixth embodiment provided with a movable body spectrum measuring apparatus of the present invention.

FIG. 24 shows the schematic configuration of a sixth embodiment of the movable body spectrum measuring apparatus according to the present invention. This embodiment is different from the second embodiment in that a vehicle state detecting device 59 as a vehicle state acquiring device and a moving state acquiring device is added. The specific configuration of the spectrum measuring apparatus 11 will be described below centering on the difference between this embodiment and the first and second embodiments. The same members as those in the first and second embodiments are given the same reference numerals in FIG. 24, and overlapping description thereof is omitted.

FIG. 24 is a diagram showing the block configuration of functions provided in a vehicle as the movable body including the movable body spectrum measuring apparatus. As shown in FIG. 24, the vehicle 10 is provided with the vehicle state detecting device 59 in addition to the spectrum measuring apparatus 11, a human machine interface 12 and a vehicle control device 13.

The vehicle state detecting device 59 is a detecting device for acquiring the state of the vehicle 10, especially, the driving state and transmits the detected vehicle state to the connected computation device 17. In this embodiment, a device for detecting a steering angle of the vehicle 10 is employed as the vehicle state detecting device 59. In addition, the vehicle state detecting device 59 may be a speedometer for detecting the vehicle speed, which is the travel speed of the vehicle 10, or an accelerometer for detecting the acceleration of the vehicle 10.

Figure 25:
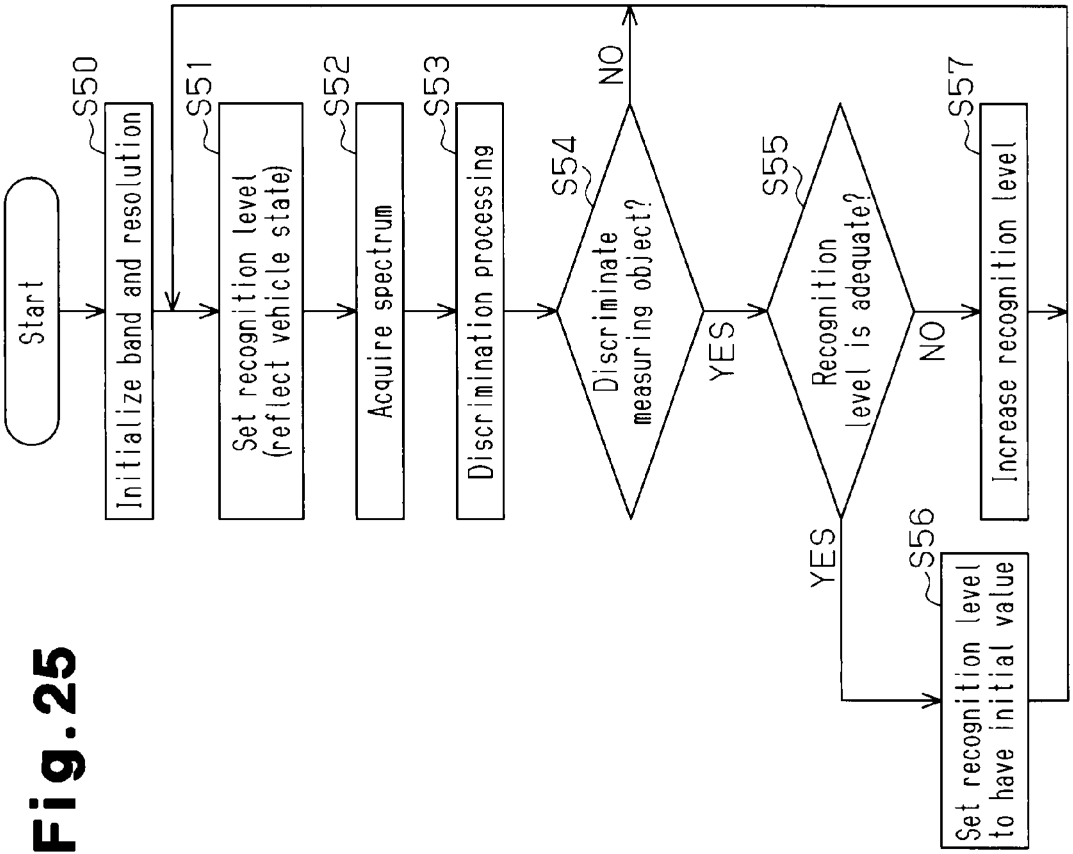
FIG. 25 is a flowchart showing discrimination processing in the sixth embodiment.

Next, the discrimination process of a measuring object in the spectrum measuring apparatus according to this embodiment will be described with reference to FIG. 25. FIG. 25 is a flowchart showing the discrimination process of a measuring object reflecting a vehicle state which is to be performed by the spectrum measuring apparatus.

A spectrum data processor 15 of the spectrum measuring apparatus 11 performs the discrimination processing of the measuring object based on the spectrum data regarding an observation light. First, the spectrum data processor 15 initializes a wavelength band and a wavelength resolution which are detected by a spectrum sensor 14A through a spectrum sensor control device 40 (Step S50 in FIG. 25).

When the initialization is ended, a discrimination level setting unit 31 of the spectrum data processor 15 selects a recognition level for discriminating the spectrum data regarding the observation light and a measuring object in the discrimination level. For example, in the case where a vehicle speed or an acceleration is acquired by the vehicle state detecting device 59, correction information for correcting a wavelength band or a wavelength resolution which regulates the spectrum data regarding the observation light into suitable limitation information in the vehicle state is selected from a state map 24. Alternatively, in the case where the steering angle is acquired, a measuring object having a high discrimination request is selected from the state map 24 or the like, thereby detecting the measuring object at a high probability. Consequently, the discrimination level setting unit 31 corrects a wavelength band and a wavelength resolution which correspond to the measuring object with correction information if any, inputs them to the spectrum sensor control device 40 and inputs the measuring object to a comparing unit 33.

Thus, the spectrum data regarding the observation light which is detected by the spectrum sensor 14A is restricted based on the wavelength band and the wavelength resolution which depend on the vehicle state (Step S51 in FIG. 25).

The computation device 17 of the spectrum data processor 15 acquires the restricted spectrum data input as required (Step S52 in FIG. 25).

The comparing unit 33 of the spectrum data processor 15 acquires dictionary data regarding the input measuring object from a dictionary data storing unit 16 and compares the dictionary data with the restricted spectrum data, thereby determining agreement between both of the data (Step S53 in FIG. 25). When it is determined that both of the data compared with each other do not agree (NO in the Step S54 of FIG. 25), the comparing unit 33 outputs information indicating that the measuring object has not been discriminated. Based on the information indicating that the discrimination has not been established, the discrimination level setting unit 31 sets to select a next measuring object without changing the discrimination level. Thereafter, the discrimination processing returns to the Step S51.

On the other hand, when it is determined that both of the data compared with each other agree (YES in the Step S54 of FIG. 25), the comparing unit 33 outputs information indicating that the measuring object has been discriminated. Based on the information indicating that the discrimination is performed, the discrimination level setting unit 31 determines whether the discrimination level is adequate or not (Step S55 in FIG. 25).

When it is determined that the discrimination level is adequate (YES in the Step S55 of FIG. 25), the discrimination level setting unit 31 of the spectrum data processor 15 returns the discrimination level into an initial value (Step S56 in FIG. 25). Then, the discrimination processing returns to the Step S31.

On the other hand, when it is determined that the discrimination level is inadequate (NO in the Step S55 of FIG. 25), the discrimination level setting unit 31 of the spectrum data processor 15 changes the discrimination level into a lower discrimination level (Step S57 in FIG. 25). Then, the discrimination processing returns to the Step S31. In other words, the measuring object is discriminated in more detail based on the vehicle state by the discrimination processing.

Figure 26A:
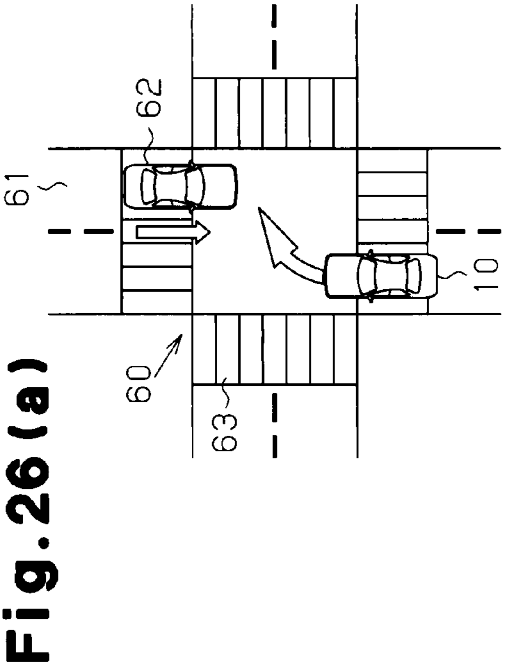
FIG. 26 are views for describing the case where a steering angle is used as a state of a vehicle in the sixth embodiment, wherein FIG. 26(*a*) is a view of the vehicle moving across a driveway and FIG. 26(*b*) is a view of a vehicle moving across a sidewalk.
Figure 26B:
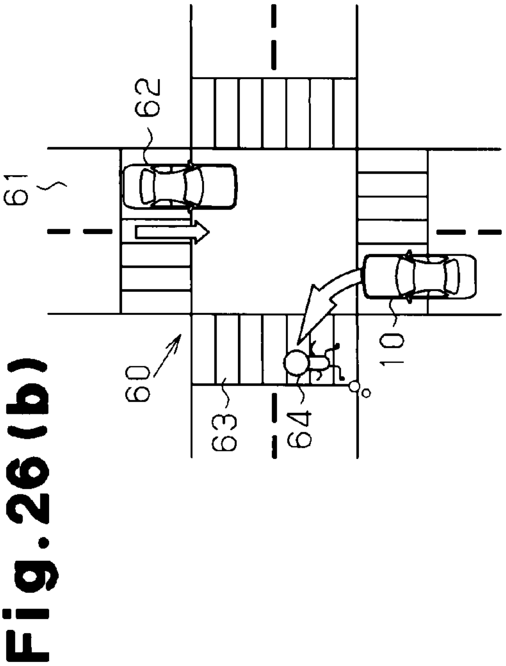
Figure 27:
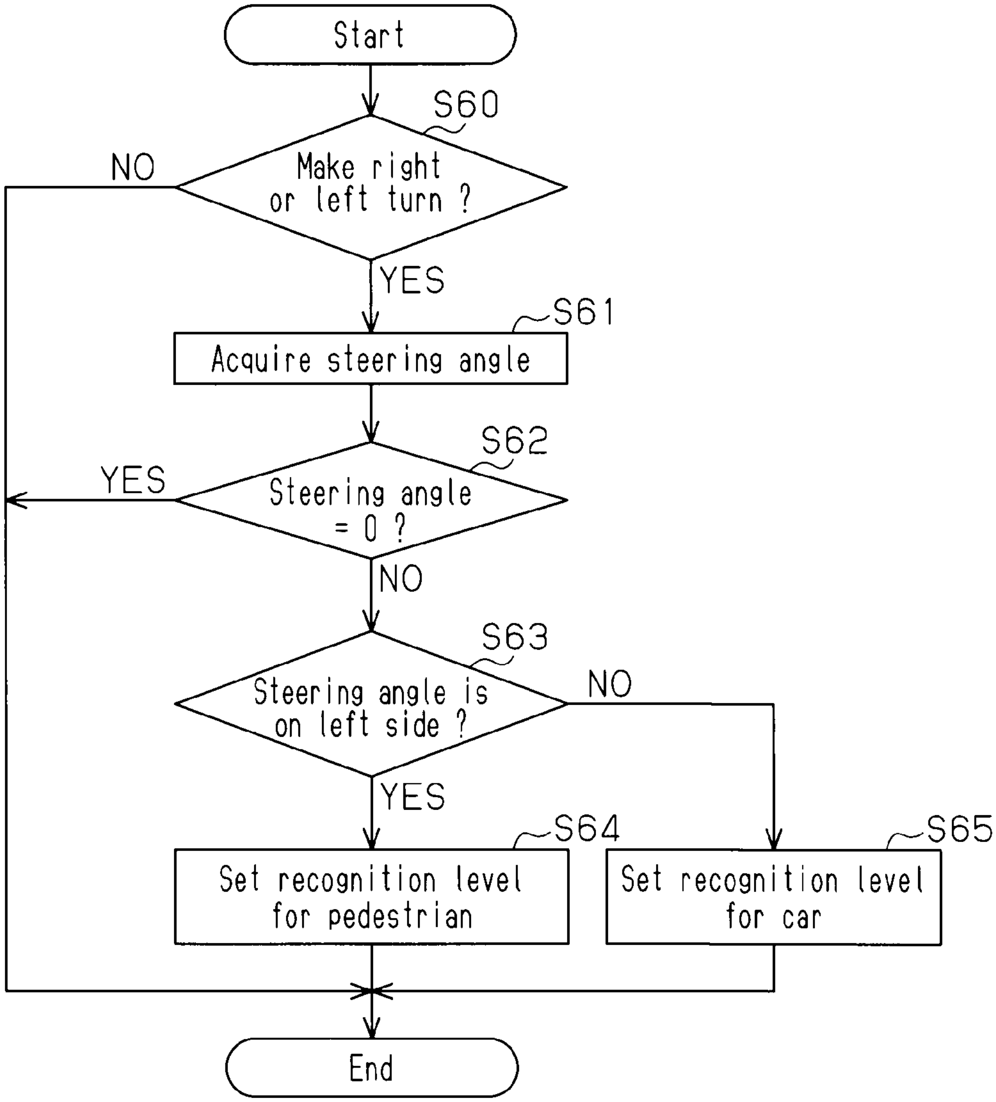
FIG. 27 is a flowchart showing the discrimination processing in the sixth embodiment.

Next, processing in the case of an acquisition of a steering angle through the vehicle state detecting device 59 will be described in detail with reference to FIGS. 26 and 27. FIG. 26 illustrates views schematically showing an intersection where steering is performed, and FIG. 26(*a*) is a view showing the case of steering of moving across a driveway and FIG. 26(*b*) is a view showing the case of steering of moving across a sidewalk. FIG. 27 is a flowchart showing discrimination processing in the case where the steering angle is acquired as a vehicle state for the setting of the recognition level (for example, Step S51 in FIG. 25) which is to be performed in the discrimination processing according to this embodiment.

As shown in FIG. 26, when making a right turn in the case of a left-hand traffic, the vehicle 10 moves across an opposite lane 61 at an intersection 60 or the like. In this case, it is particularly necessary to take care for an oncoming car 62. For this reason, the priority for "car" as a measuring object is increased. When making a left turn in the case of the left-hand traffic, the vehicle 10 moves across a sidewalk 63 at the intersection 60 or the like. In this case, it is particularly necessary to take care for a pedestrian 64. For this reason, the priority for "person" as the measuring object is increased.

In such a case, in the setting of the recognition level in the discrimination processing, the recognition level is set on the basis of the steering angle as shown in the flowchart of FIG. 27. In other words, when it is detected that the right turn or the left turn is made in the recognition level setting (YES in Step S60 of FIG. 27), the steering angle is acquired (Step S61 in FIG. 27). If the steering angle is not zero degrees, (YES in Step S62 of FIG. 27), an adequate measuring object is set in accordance with the steering angle. If the steering angle is on a left side (YES in Step S63 of FIG. 27), the possibility increases that the vehicle 10 might move across the sidewalk 63. Therefore, a recognition level for a pedestrian is set (Step S64 in FIG. 27). Consequently, "person" is selected as the measuring object in the recognition level setting. In other words, if the steering angle is on the right side (NO in the Step S63 of FIG. 27), the possibility is increased that the vehicle 10 might move across the opposite lane 61. Therefore, a recognition level for a car is set (Step S65 in FIG. 27). Consequently, "car" is selected as the measuring object in the recognition level setting.

Thus, in a case where the discrimination processing is performed by using the spectrum sensor, precision in the discrimination is maintained to be high and a part of the processing is omitted, thereby reducing the time necessary for the discrimination processing.

As described above, this embodiment can achieve advantages that are equal or equivalent to the advantages (1) to (11) in the first and second embodiments as well as the following advantages.

(19) The discrimination processing is preferentially performed for the measuring object having a high priority which is determined in accordance with the moving state acquired by the vehicle state detecting device 59 as the moving state acquiring device. Accordingly, it is possible to discriminate the measuring object quickly and to omit the processing for recognizing a measuring object having a low occurrence ratio, thereby reducing the time necessary for the discrimination processing.

(20) The measuring object having a high priority is determined based on speed information including a speed of a movable body, acceleration information including an acceleration or steering information including a steering angle. For example, it is possible to change the discrimination level according to the speed information or the acceleration information so that the discrimination processing is finished within a predetermined period. Further, according to the steering information, the measuring object is set to the car in the case of steering to travel across a driveway and is set to a pedestrian in the case of steering to travel across a sidewalk.

Each of the above-mentioned embodiments can also be implemented by the following mode, for example.

Each of the above-mentioned embodiments exemplifies the case where the wavelength information includes the wavelength band information and the wavelength resolution information. However, the present invention is not limited thereto but it is sufficient that the wavelength information includes at least one of the wavelength band information and the wavelength resolution information. In this case, the amount of data to be used in the comparison computation can be optionally set based on the wavelength band information or the wavelength resolution information. Thus, it is possible to increase the degree of freedom in the mode for the limitation information.

Each of the above-mentioned embodiments exemplifies the case where the spectrum data is restricted based on the wavelength band information and the wavelength resolution information. However, the present invention is not limited thereto but the spectrum data may be restricted by either the wavelength band information or the wavelength resolution information, thereby increasing the degree of freedom in the mode of the restriction of the spectrum data.

The second embodiment exemplifies the case where the wavelength resolution and the wavelength band are set to the spectrum sensor 14A. However, the present invention is not limited thereto but either of the wavelength resolution and the wavelength band may be set to the spectrum sensor, thereby increasing the degree of freedom in the selection of the spectrum sensor.

The first embodiment exemplifies the case where the vehicle control device 13 transmits the information on the discriminated measuring object to the other various control devices. However, the present invention is not limited thereto. When the vehicle control device can perform drive assistance, it may perform the drive assistance by itself without transmitting the information on the discriminated measuring object to the other various control devices, thereby increasing the degree of freedom of the performance as the movable body spectrum measuring apparatus.

The first embodiment exemplifies the case where the dictionary data is held in the dictionary data storing unit 16 as the first storing unit and the limitation information is held in the limitation information storing unit 18 as the second storing unit. At this time, the first storing unit for storing the dictionary data and the second storing unit for retaining the limitation information may be provided in separate storing units respectively or may be provided as a mode sharing the same storing device, thereby increasing the degree of freedom of the performance as the movable body spectrum measuring apparatus.

The second embodiment exemplifies the example in which the spectrum sensor control device 40 is provided separately from the spectrum sensor 14A. However, the present invention is not limited thereto but the spectrum sensor control device may be provided integrally with the spectrum sensor. Consequently, it is also possible to reduce the size of the spectrum measuring apparatus through a modularization of the spectrum sensor.

The restricting unit 32 is provided in the discrimination unit 30 of the computation device 17 in the first embodiment and the spectrum sensor control device 40 functions as the restricting unit in the second embodiment. However, the present invention is not limited thereto but the spectrum sensor control device and the discrimination unit of the computation device may be provided together. In that case, it is also possible to restrict the spectrum data regarding the observation light more finely by providing limitation information separately.

It is preferable that the vehicle in each of the above-mentioned embodiments should be a car. Even when being mounted on a car, such a spectrum measuring apparatus can recognize a measuring object that sequentially approaches during driving on the road in real time to achieve adequate driving assistance. This increases the adoptability of the spectrum measuring apparatus for a car.

In each of the above-mentioned embodiments, the vehicle is not limited to the car, and movable bodies moving on the road, such as motorcycles and robots can employ such a movable body spectrum measuring apparatus.

DESCRIPTION OF THE REFERENCE NUMERALS

10 . . . Vehicle, 11 . . . Spectrum Measuring apparatus, 12 . . . Human Machine Interface, 13 . . . Vehicle Control Device, 14, 14A . . . Spectrum Sensor, 15 . . . Spectrum Data Processor, 16 . . . Dictionary Data Storing Unit, 17 . . . Computation Device, 18 . . . limitation Information Storing Unit, 20 . . . Discrimination Level Data Storing Unit, 21 . . . Wavelength Band Map Storing Unit, 22 . . . Wavelength Resolution Map Storing Unit, 23 . . . Environment Map, 24 . . . State Map, 25 . . . Discrimination Level Map, 26 . . . Wavelength Band Map, 27 . . . Wavelength Resolution Map, 29 . . . Landscape, 30 . . . Discrimination Unit, 31 . . . Discrimination Level Setting Unit, 32 . . . Restricting Unit, 33 . . . Comparing Unit, 40 . . . Spectrum Sensor Control Device, 41 . . . Wavelength Band Setting Device, 42 . . . Wavelength Resolution Setting Device, 50 . . . Object Detecting Device, 52 . . . Environment Information Acquiring Device, 54 . . . Intended Purpose Selecting Device, 55 . . . Discrimination Object Selecting Button, 56 . . . Pedestrian Selecting Button, 57 . . . Vehicle Selecting Button, 58 . . . Signal Selecting Button, 59 . . . Vehicle State Detecting Device, 60 . . . Intersection, 61 . . . Opposite Lane, 62 . . . Oncoming Car, 63 . . . Sidewalk, 64 . . . Pedestrian.

The invention claimed is:

1. A movable body spectrum measuring apparatus having a spectrum sensor mounted on a movable body, the spectrum sensor being capable of measuring wavelength information and light intensity information, and the movable body spectrum measuring apparatus discriminating a measuring object in the surroundings of the movable body based on spectrum data regarding an observation light detected by the spectrum sensor, the movable body spectrum measuring apparatus comprising:
- a first storing unit for storing, as dictionary data, spectrum data including wavelength information and light intensity information for a plurality of predetermined measuring objects;
- a second storing unit for storing limitation information for limiting wavelength information included in a wavelength region of the spectrum data regarding the observation light to a part of the wavelength information classified based on an attribute of the measuring object;
- a discrimination level setting unit for selectively setting limitation information corresponding to a required discrimination level of the measuring object from the limitation information stored in the second storing unit;
- a restricting unit for restricting the spectrum data regarding the observation light to spectrum data consisting of only the wavelength information limited based on the selectively set limitation information; and
- a discrimination unit for discriminating the measuring object based on comparison between the spectrum data restricted by the restricting unit and the spectrum data stored in the first storing unit.

2. The movable body spectrum measuring apparatus according to claim 1, wherein the wavelength information limited by the limitation information includes at least one of wavelength band information and wavelength resolution information, the wavelength band information being information indicative of a partial wavelength band obtained by reducing a wavelength region of the spectrum data regarding the observation light, and wavelength resolution information being information indicative of a wavelength resolution as the spectrum data.

3. The movable body spectrum measuring apparatus according to claim 2, wherein a required discrimination level of the measuring object is divided into a plurality of hierarchies as discrimination level data, and at least one of the wavelength band information and the wavelength resolution information is respectively caused to correspond to the hierarchized discrimination level data and is stored in the second storing unit.

4. The movable body spectrum measuring apparatus according to claim 3, wherein the wavelength band information or the wavelength resolution information which is respectively caused to correspond to the discrimination level data is separately changed into map data in the second storing unit.

5. The movable body spectrum measuring apparatus according to claim 2, wherein at least one of the wavelength band information and the wavelength resolution information is set in such a manner that spectrum data to be restricted through the restricting unit has an equal data amount in all discrimination levels.

6. The movable body spectrum measuring apparatus according to claim 2, wherein the restricting unit restricts spectrum data output from the spectrum sensor such that the restricted spectrum data at least has a wavelength band designated by the wavelength band information or a wavelength resolution designated by the wavelength resolution information.

7. The movable body spectrum measuring apparatus according to claim 2, wherein the movable body is provided with a spectrum sensor control device for causing at least one of an observation wavelength band and an observation wavelength resolution in the spectrum sensor to be variable, and, through the spectrum sensor control device, the restricting unit restricts spectrum data regarding an observation light detected by the spectrum sensor such that the restricted spectrum data has a wavelength band designated by the wavelength band information or a wavelength resolution designated by the wavelength resolution information.

8. The movable body spectrum measuring apparatus according to claim 1, wherein the required discrimination level of the measuring object is automatically updated recursively in accordance with a discrimination content of the measuring object discriminated by the discrimination unit.

9. The movable body spectrum measuring apparatus according to claim 1, wherein the movable body is further provided with an object detecting device for detecting the measuring object, and a measuring object is set by the spectrum sensor in accordance with the measuring object detected by the object detecting device.

10. The movable body spectrum measuring apparatus according to claim 1, wherein the movable body is provided with an environment information acquiring device for acquiring surrounding environment information, and a measuring object is set by the spectrum sensor in accordance with the environment information acquired by the environment information acquiring device.

11. The movable body spectrum measuring apparatus according to claim 10, wherein the environment information acquired by the environment information acquiring device is at least one of weather information and position information of the movable body.

12. The movable body spectrum measuring apparatus according to claim 1, wherein the movable body is provided with an intended purpose selecting device for selecting an intended purpose of the spectrum sensor, and a measuring object is set by the spectrum sensor in accordance with the intended purpose selected through the intended purpose selecting device.

13. The movable body spectrum measuring apparatus according to claim 12, wherein the intended purpose selecting device includes a group of selecting switches to be manually operated by a driver of the movable body, and a measuring object selected through the selecting switch group is set as a measuring object through the spectrum sensor.

14. The movable body spectrum measuring apparatus according to claim 12, wherein the movable body is provided with a drive assistance system for assisting driving, and the intended purpose selecting device selects a measuring object to meet an intended purpose in cooperation with the drive assistance system.

15. The movable body spectrum measuring apparatus according to claim 1, wherein the movable body is provided with a moving state acquiring device for acquiring information on a moving state of the movable body, and a measuring object is set by the spectrum sensor in accordance with the moving state of the movable body which is acquired by the moving state acquiring device.

16. The movable body spectrum measuring apparatus according to claim 15, wherein information on the moving state of the movable body, which is acquired by the moving state acquiring device, is at least one of speed information, acceleration information, and steering information of the movable body.

17. The movable body spectrum measuring apparatus according to claim 1, wherein the movable body is an automobile driving on a road surface.

* * * * *